(12) United States Patent
Marruchella et al.

(10) Patent No.: US 11,086,302 B2
(45) Date of Patent: *Aug. 10, 2021

(54) RECIPE COMMAND STEPS AND RECIPE INPUTS FROM EXTERNAL LOGIC

(71) Applicant: FISHER-ROSEMOUNT SYSTEMS, INC., Round Rock, TX (US)

(72) Inventors: Dawn M. Marruchella, Austin, TX (US); William G. Irwin, Singapore (SG); Godfrey R. Sherriff, Austin, TX (US); Tusar Nanda, Round Rock, TX (US)

(73) Assignee: FISHER-ROSEMOUNT SYSTEMS, INC., Round Rock, TX (US)

(*) Notice: Subject to any disclaimer, the term of this patent is extended or adjusted under 35 U.S.C. 154(b) by 723 days.

This patent is subject to a terminal disclaimer.

(21) Appl. No.: 14/099,077

(22) Filed: Dec. 6, 2013

(65) Prior Publication Data

US 2014/0094947 A1    Apr. 3, 2014

Related U.S. Application Data

(63) Continuation of application No. 12/240,959, filed on Sep. 29, 2008, now Pat. No. 8,606,379.

(51) Int. Cl.
*G05B 19/41* (2006.01)
*G06Q 10/06* (2012.01)
(Continued)

(52) U.S. Cl.
CPC . *G05B 19/41865* (2013.01); *G05B 19/41835* (2013.01); *G06Q 10/06* (2013.01);
(Continued)

(58) Field of Classification Search
CPC ........ G05B 19/41865; G05B 19/41835; G05B 19/056; G05B 19/0426; G06Q 10/06;
(Continued)

(56) References Cited

U.S. PATENT DOCUMENTS 4,570,217 A * 2/1986 Allen .................. G06F 1/14
                                                    700/83
5,058,043 A * 10/1991 Skeirik .............. B01J 19/004
                                                    700/167
(Continued)

FOREIGN PATENT DOCUMENTS

EP    2 169 493 A1    3/2010
GB    2 348 020 A     9/2000
(Continued)

OTHER PUBLICATIONS

Informetric Systems, Inc., "InfoBatch™", 2008, retrieved from the Internet at "www.informetric.com" on Jul. 10, 2016.*
(Continued)

*Primary Examiner* — Mohammad Ali
*Assistant Examiner* — Kelvin Booker
(74) *Attorney, Agent, or Firm* — Marshall, Gerstein & Borun LLP

(57) ABSTRACT

A method of generating a product recipe for execution by a batch process in an automated manufacturing environment, such the product recipe is associated with a plurality of actions, a set of transitions, and a set of parameters, and such that the plurality of actions define a plurality of logical levels including a phase level at which the batch process interacts with equipment, includes receiving a procedure definition specifying the plurality of actions, receiving a transaction definition specifying the set of transitions so that each one in the set of transitions is associated with two or more of the plurality of actions, and receiving the set of parameters. Receiving the set of parameters includes receiving at least one dynamic input parameter that resolves to a value without obtaining the value from the product recipe or an operator prompt associated at the phase level of the product recipe.

29 Claims, 13 Drawing Sheets

(51) Int. Cl.
  *G05B 19/04* (2006.01)
  *G05B 19/05* (2006.01)
  *G05B 19/418* (2006.01)
  *G05B 19/042* (2006.01)
(52) U.S. Cl.
  CPC ........ *G05B 19/0426* (2013.01); *G05B 19/056* (2013.01); *Y02P 90/02* (2015.11)
(58) Field of Classification Search
  CPC ........ Y02P 90/18; Y02P 90/20; Y02P 90/265; Y02P 90/12
  See application file for complete search history.

(56) References Cited

U.S. PATENT DOCUMENTS

| | | | | |
|---|---|---|---|---|
| 5,305,221 | A * | 4/1994 | Atherton | G05B 19/41885 700/112 |
| 5,371,895 | A * | 12/1994 | Bristol | G05B 19/0426 700/86 |
| 5,450,346 | A | 9/1995 | Krummen et al. | |
| 5,463,555 | A * | 10/1995 | Ward | G06Q 10/06 700/100 |
| 5,481,716 | A | 1/1996 | Morshedi et al. | |
| 5,485,620 | A | 1/1996 | Sadre et al. | |
| 5,487,144 | A | 1/1996 | Takahashi et al. | |
| 5,499,188 | A | 3/1996 | Kline, Jr. et al. | |
| 5,576,946 | A * | 11/1996 | Bender | G05B 19/41865 700/17 |
| 5,777,876 | A * | 7/1998 | Beauchesne | G05B 19/41865 700/104 |
| 5,960,417 | A * | 9/1999 | Pan | G06Q 10/04 705/400 |
| 6,115,646 | A | 9/2000 | Fiszman et al. | |
| 6,141,647 | A | 10/2000 | Meijer et al. | |
| 6,148,244 | A | 11/2000 | Tucker et al. | |
| 6,263,255 | B1 * | 7/2001 | Tan | G05B 19/41845 700/106 |
| 6,289,252 | B1 * | 9/2001 | Wilson | G05B 19/045 700/7 |
| 6,345,259 | B1 | 2/2002 | Sandoval | |
| 6,385,496 | B1 | 5/2002 | Irwin et al. | |
| 6,449,524 | B1 | 9/2002 | Miller et al. | |
| 6,522,934 | B1 | 2/2003 | Irwin et al. | |
| 6,625,512 | B1 * | 9/2003 | Goodwin | G03F 7/70625 257/E21.525 |
| 6,629,003 | B1 * | 9/2003 | Frizzell | G05B 19/41865 700/97 |
| 6,647,315 | B1 * | 11/2003 | Sherriff | G05B 19/042 700/204 |
| 6,834,370 | B1 * | 12/2004 | Brandl | G05B 19/41865 715/201 |
| 6,884,147 | B2 | 4/2005 | Toprac | |
| 6,912,437 | B2 * | 6/2005 | Chong | H01L 22/20 257/E21.525 |
| 6,928,328 | B2 * | 8/2005 | Deitz | G06F 21/64 700/86 |
| 6,947,917 | B1 | 9/2005 | Mathur et al. | |
| 6,950,714 | B2 | 9/2005 | Bickley et al. | |
| 6,960,774 | B2 * | 11/2005 | Coss, Jr. | H01J 37/3023 250/492.2 |
| 6,985,779 | B2 | 1/2006 | Hsiung et al. | |
| 7,020,876 | B1 * | 3/2006 | Deitz | G05B 19/41865 700/1 |
| 7,031,782 | B2 | 4/2006 | Kappelhoff et al. | |
| 7,054,704 | B2 | 5/2006 | Bickley et al. | |
| 7,069,101 | B1 * | 6/2006 | Arackaparambil | G05B 19/41845 700/121 |
| 7,082,345 | B2 * | 7/2006 | Shanmugasundram | B24B 37/042 257/E21.244 |
| 7,085,607 | B2 | 8/2006 | Lipner et al. | |
| 7,123,978 | B2 * | 10/2006 | Hartman | G06N 99/005 700/108 |
| 7,127,304 | B1 | 10/2006 | Gould et al. | |
| 7,133,732 | B1 | 11/2006 | Kappelhoff et al. | |
| 7,135,412 | B2 * | 11/2006 | Na | H01J 37/32082 216/61 |
| 7,149,595 | B2 | 12/2006 | D'Mura | |
| 7,260,443 | B2 | 8/2007 | Morinaga et al. | |
| 7,272,459 | B2 | 9/2007 | Kokotov et al. | |
| 7,280,885 | B1 * | 10/2007 | Brown | G05B 19/41865 700/121 |
| 7,313,453 | B2 | 12/2007 | Kline, Jr. | |
| 7,349,753 | B2 * | 3/2008 | Paik | G05B 19/41875 700/109 |
| 7,353,078 | B2 * | 4/2008 | Chung | G03F 7/70525 700/100 |
| 7,369,913 | B2 | 5/2008 | Heminway et al. | |
| 7,392,104 | B1 | 6/2008 | Kappelhoff et al. | |
| 7,444,193 | B2 | 10/2008 | Cutler | |
| 7,460,917 | B1 * | 12/2008 | Reichard | G05B 19/05 700/33 |
| 7,461,040 | B1 * | 12/2008 | Goldman | G05B 13/048 704/275 |
| 7,489,980 | B2 * | 2/2009 | Behm | G05B 19/4188 700/121 |
| 7,546,232 | B2 | 6/2009 | Brooks et al. | |
| 7,634,384 | B2 * | 12/2009 | Eryurek | G05B 15/02 700/95 |
| 7,680,970 | B2 * | 3/2010 | Sherriff | G05B 19/41865 700/19 |
| 7,698,012 | B2 * | 4/2010 | Shanmugasundram | B24B 49/03 700/110 |
| 7,721,273 | B1 * | 5/2010 | Hall | G05B 19/056 700/7 |
| 7,783,375 | B2 * | 8/2010 | Shanmugasundram | B24B 37/013 700/121 |
| 7,793,292 | B2 * | 9/2010 | Worek | G05B 19/4183 700/17 |
| 7,844,349 | B2 * | 11/2010 | Weatherhead | G05B 19/41865 700/19 |
| 7,899,566 | B2 * | 3/2011 | Behm | G05B 19/4188 700/121 |
| 7,904,191 | B2 | 3/2011 | Rossi et al. | |
| 7,974,723 | B2 * | 7/2011 | Moyne | G05B 19/41865 700/101 |
| 7,983,775 | B2 | 7/2011 | Kappelhoff et al. | |
| 8,150,541 | B2 * | 4/2012 | Moore, Jr. | G05B 19/41865 700/103 |
| 8,160,735 | B2 | 4/2012 | Sinclair et al. | |
| 8,369,975 | B2 | 2/2013 | Pettus et al. | |
| 8,555,206 | B2 * | 10/2013 | Pederson | G05B 19/409 715/859 |
| 8,825,189 | B2 * | 9/2014 | Moore, Jr. | G05B 19/41865 700/29 |
| 9,323,247 | B2 * | 4/2016 | Dillon | G05B 23/0272 |
| 10,088,837 | B1 * | 10/2018 | Strain | G05B 19/41865 |
| 2002/0059003 | A1 * | 5/2002 | Ruth | G06F 17/30893 700/19 |
| 2002/0062162 | A1 * | 5/2002 | Bunkofske | G05B 23/0221 700/108 |
| 2002/0077717 | A1 * | 6/2002 | Harburda | G06Q 10/06 700/99 |
| 2002/0077718 | A1 * | 6/2002 | Harburda | G06Q 10/087 700/106 |
| 2003/0069795 | A1 * | 4/2003 | Boyd | G06Q 10/087 705/22 |
| 2003/0139936 | A1 * | 7/2003 | Saucier | G06Q 10/06 705/301 |
| 2003/0149608 | A1 * | 8/2003 | Kall | G06Q 10/06 705/7.27 |
| 2003/0220709 | A1 * | 11/2003 | Hartman | G06N 99/005 700/121 |
| 2004/0010334 | A1 | 1/2004 | Bickley et al. | |

(56) References Cited

U.S. PATENT DOCUMENTS

| | | |
|---|---|---|
| 2004/0024477 A1* | 2/2004 | Deitz .................... G06F 21/64 700/86 |
| 2004/0122641 A1* | 6/2004 | Miller ................. G06F 17/277 703/12 |
| 2004/0198180 A1 | 10/2004 | Toprac |
| 2004/0220897 A1* | 11/2004 | Bernhart ......... G01N 27/44717 |
| 2004/0267395 A1 | 12/2004 | Discenzo et al. |
| 2005/0038536 A1 | 2/2005 | D'Mura |
| 2005/0065626 A1 | 3/2005 | Kappelhoff et al. |
| 2005/0092939 A1* | 5/2005 | Coss, Jr. ............. H01J 37/3023 250/492.21 |
| 2005/0159982 A1* | 7/2005 | Showalter ............. G06F 19/366 705/2 |
| 2005/0246042 A1 | 11/2005 | Bickley et al. |
| 2006/0020362 A1* | 1/2006 | Morinaga ........ G05B 19/41865 700/121 |
| 2006/0075066 A1 | 4/2006 | Farchmin et al. |
| 2006/0089739 A1 | 4/2006 | Sherriff et al. |
| 2006/0100719 A1 | 5/2006 | Jarrett et al. |
| 2006/0155406 A1 | 7/2006 | Rossi et al. |
| 2006/0259500 A1 | 11/2006 | Hood et al. |
| 2006/0265098 A1 | 11/2006 | Gould et al. |
| 2007/0050070 A1* | 3/2007 | Strain .................... G06Q 10/06 700/99 |
| 2007/0073426 A1 | 3/2007 | Chand |
| 2007/0078667 A1* | 4/2007 | Chand .................... G06Q 10/10 700/12 |
| 2007/0150330 A1* | 6/2007 | McGoveran ..... G06Q 10/06398 705/7.13 |
| 2007/0156275 A1* | 7/2007 | Piper .................. G03F 7/70508 700/121 |
| 2007/0198993 A1* | 8/2007 | Zhang .................... G06F 9/542 719/318 |
| 2007/0224840 A1* | 9/2007 | Renau ............... H01J 37/32935 438/798 |
| 2007/0283030 A1* | 12/2007 | Deininger ........ G05B 19/41865 709/230 |
| 2008/0015714 A1 | 1/2008 | Rudnick et al. |
| 2008/0052386 A1 | 2/2008 | Johnson et al. |
| 2008/0064127 A1* | 3/2008 | Yu .......................... H01L 22/12 438/14 |
| 2008/0065242 A1* | 3/2008 | Attarwala ............ G05B 13/048 700/44 |
| 2008/0082186 A1 | 4/2008 | Hood et al. |
| 2008/0082577 A1 | 4/2008 | Hood et al. |
| 2008/0097623 A1 | 4/2008 | Weatherhead et al. |
| 2008/0097624 A1 | 4/2008 | Weatherhead et al. |
| 2008/0097636 A1 | 4/2008 | Kline |
| 2008/0098351 A1 | 4/2008 | Weatherhead et al. |
| 2008/0098401 A1 | 4/2008 | Weatherhead et al. |
| 2008/0109089 A1* | 5/2008 | Shanmugasundram .................... B24B 37/013 700/28 |
| 2008/0109100 A1* | 5/2008 | Macharia .................. C10L 1/02 700/110 |
| 2008/0109200 A1* | 5/2008 | Bartee ....................... C12P 7/06 703/12 |
| 2008/0127186 A1 | 5/2008 | Kanodia et al. |
| 2008/0134073 A1* | 6/2008 | Bergantino ........ G05B 19/0426 715/771 |
| 2008/0147207 A1 | 6/2008 | D'Mura et al. |
| 2008/0147228 A1* | 6/2008 | Fenner ............. G05B 19/41835 700/121 |
| 2008/0161958 A1* | 7/2008 | Davidson .................. G01J 3/02 700/109 |
| 2008/0255680 A1 | 10/2008 | Kappelhoff et al. |
| 2008/0269917 A1* | 10/2008 | Chand .................... G06Q 10/10 700/17 |
| 2008/0288089 A1* | 11/2008 | Pettus ................ G05B 19/4184 700/9 |
| 2009/0064019 A1* | 3/2009 | Cahill .................... G05B 15/02 715/765 |
| 2009/0082894 A1 | 3/2009 | Pettus et al. |
| 2009/0089030 A1* | 4/2009 | Sturrock ............. G06F 17/5009 703/7 |
| 2009/0125126 A1* | 5/2009 | Moore, Jr. ....... G05B 19/41865 700/29 |
| 2009/0125906 A1* | 5/2009 | Moore, Jr. ....... G05B 19/41865 718/101 |
| 2009/0164031 A1 | 6/2009 | Johnson et al. |
| 2009/0164933 A1* | 6/2009 | Pederson ............. G05B 19/409 715/772 |
| 2009/0187866 A1* | 7/2009 | Ou .......................... G06F 30/20 716/136 |
| 2009/0327002 A1* | 12/2009 | Chapman ............... G06Q 10/06 705/7.27 |
| 2010/0082119 A1 | 4/2010 | Case et al. |
| 2010/0087935 A1 | 4/2010 | Pettus et al. |
| 2010/0153154 A1 | 6/2010 | Bergantino et al. |
| 2010/0217420 A1 | 8/2010 | Sinclair et al. |
| 2010/0274377 A1 | 10/2010 | Kaufman et al. |
| 2011/0022198 A1* | 1/2011 | Plache ................. G05B 19/0426 700/86 |
| 2011/0230980 A1* | 9/2011 | Hammack ............ G05B 19/409 700/17 |
| 2012/0029661 A1* | 2/2012 | Jones .................. G05B 19/0426 700/17 |
| 2012/0183675 A1* | 7/2012 | Reineccius ............... A01C 1/06 427/4 |
| 2016/0034305 A1* | 2/2016 | Shear .................... G06F 16/248 707/722 |
| 2019/0033819 A1* | 1/2019 | Chao ...................... G16B 50/00 |

FOREIGN PATENT DOCUMENTS

| | | |
|---|---|---|
| JP | H8-112728 A | 5/1996 |
| JP | 2002-297234 A | 10/2002 |
| JP | 2004/038261 | 2/2004 |
| JP | 2005/128862 | 5/2005 |
| JP | 2006/40930 | 2/2006 |
| JP | 2006-139773 A | 6/2006 |
| JP | 2007/094856 | 4/2007 |
| JP | 2007/233987 A | 9/2007 |
| JP | 2009/146386 A | 7/2009 |
| JP | 2010/086534 A | 4/2010 |
| JP | 2010/086541 A | 4/2010 |

OTHER PUBLICATIONS

Digital Equipment Corporation, "Process Data Acquisition System, Integrating SAP R/3 with the Manufacturing Process", 1995, retrieved from the Internet on Jul. 11, 2016.*

Foodmanufacturing.com, "New Control System is the Recipe for Improved Batch Food Processing", Nov. 2004. (Year: 2004).*

Cahill, J., "Integrated Recipe Authoring—Emerson Automation Experts Emerson Automation Experts", Aug. 2006, received from the Internet at "https://www.emersonautomationexperts.com/2006/data-management/integrated_reci/". (Year: 2006).*

Edgar et al., "Automatic control in microelectronics manufacturing: Practices, challenges, and possibilities", May 1998, Automatica 36 (2000) 1567,1603. (Year: 1998).*

Poloski et al., "Application of model predictive control to batch processes", May 1999, Computers and Chemical Engineering 27 (2003) 913-926. (Year: 1999).*

Office Action for Chinese Patent Application No. 201410026268.2, dated Nov. 26, 2015.

Cybulski et al., "Find Chemicals Manufacture: Technology and Engineering," Section 5.4.6.3 (pp. 360-364), Section 5.4.6.4 (pp. 364-374) Referex (2001).

Cybulski et al., "Design and Scheduling of Batch Plants," *Fine Chemicals Manufacture: Technology and Engineering*, Chapter 7.4 pp. 461-513 (2001).

European Search Report for Application No. 09171494.9, dated Dec. 30, 2009.

Search Report under Section 17 for Application No. GB0914880.0, dated Dec. 18, 2009.

Examination Report under Section 18(3) for corresponding application No. GB0914880.0 dated Feb. 24, 2012.

(56) References Cited

OTHER PUBLICATIONS

Communication in EP Application No. 09 171 494.9 dated Feb. 15, 2013, 5 pages.
First Office Action in CN Application No. 200910168913.3 dated Mar. 5, 2013.
Notice of Reasons for Rejection for Japanese Application No. 2009-221803, dated Aug. 27, 2013.
Philippine Office Action for Application No. 12009000270 dated Feb. 29, 2012.
Examination Report for Application No. GB0914880.0, dated Oct. 18, 2012.
Combined Search and Examination Report for Application No. GB1216655.9, dated Nov. 27, 2012.
Communication pursuant to Rule 115(1) EPC dated Mar. 20, 2015 by the European Patent Office for European Application No. 09171494.9-1802 (4 pages.).
Decision of Refusal for Japanese Application No. 2009-221803, dated Mar. 11, 2014.
Cybulski et al., "Design and Scheduling of Batch Plants," Fine Chemicals Manufacture: Technology and Engineering, Fig. 5.4-62, pp. 369-370 (2001).
Office Action for Japanese Patent Application No. 2014-141085, dated Aug. 4, 2015.
Office Action for Chinese Patent Application No. 201410026268.2, dated Jul. 18, 2016.
Office Action for Chinese Patent Application No. 201410026268.2, dated Nov. 14, 2016.
Decision of Refusal—Final Office Action for Japanese Patent Application No. 2016-154406, dated Jul. 3, 2018.
Notice of Reasons for Rejection for Japanese Application No. 2018-236102, dated Feb. 4, 2020.

* cited by examiner

RECIPE COMMAND STEPS AND RECIPE INPUTS FROM EXTERNAL LOGIC

CROSS-REFERENCE TO RELATED APPLICATION

This application is a continuation patent application of U.S. patent application Ser. No. 12/240,959, filed on Sep. 29, 2008, and entitled "Recipe Command Steps and Recipe Inputs from External Logic;" the entire disclosure of which is hereby expressly incorporated herein by reference.

FIELD OF TECHNOLOGY

The present invention relates generally to process control networks and, more particularly, to a batch execution environment that supports predefined command sets at any level of recipe hierarchy and dynamic input parameters.

DESCRIPTION OF THE RELATED ART

Process control systems, such as those that use batch processing techniques to produce large quantities of pharmaceuticals, chemicals, beverages, paint, or any other product, generally include one or more centralized process controllers communicatively coupled to one or more field devices which may be, for example, valve positioners, switches, sensors (such as temperature, pressure and flow rate sensors), etc. These field devices may be associated with control equipment such as, for example, valves, pumps, mixing units, etc., may perform physical control functions (such as opening or closing a valve, turning a pump or mixing unit on and off, etc.) within a process control system, may take measurements within the process control system for use in controlling the operation of the process or may perform any other desired function within the process control system. Generally speaking, the process controllers receive signals indicative of measurements made by one or more field devices and/or other information pertaining to the field devices, use this information to implement a typically complex control routine and generate control signals that are sent via the signal lines or buses to the field devices to control the operation of the process control system.

Furthermore, the process controllers are generally coupled via a data highway, such as an Ethernet bus, to one or more workstations and other devices. These other devices typically run other applications or programs that use the information provided by the one or more controllers to provide other process control functions, such as providing a user interface to the control routine, enabling modification or updating of the control routine, interfacing with the field devices, storing historical process control data, controlling or restricting user access, etc. In some large process control systems, one or more workstations located at a remote site may be coupled to the data highway via a further communication network, such as an Internet connection, a satellite or cellular communication link, a radio link (as used in wireless Ethernet connections), etc.

Process control systems that produce batches of products typically include a graphical interface, which enables a user (e.g., an engineer) to define and store one or more basic product recipes, batch parameters, equipment lists, etc. These basic product recipes typically include a sequence of process steps that are each associated with or bound to a particular equipment list. In binding recipe process steps to particular pieces of equipment, the user (e.g., an operator) explicitly defines, prior to the batch execution of the recipe, which piece of process control equipment to be used to carry out each process step of the recipe. Additionally, each of the process steps may require a user (e.g., an operator) to define one or more input/output (I/O) batch parameter values that are used during the execution of a batch to control the sequence and/or timing of equipment operations, set alarm limits, set target control values (e.g., setpoints), etc. These I/O parameter values may be associated with inputs and outputs that are sent to or which are received from one or more of the field devices within the process control system or, alternatively, may be intermediate or calculated values that are generated by the process control system during the execution of a batch. Thus, in defining a batch, a user (e.g., an operator) typically uses the graphical interface to select a basic product recipe (which includes specifications that bind the process steps of the recipe to process control equipment) and to specify the parameter values that are to be used during execution of the batch. For example, in a control system that produces batches of paint, a user (e.g., an operator) may interact with the graphical interface to select a basic paint recipe such as, for example, a semi-gloss exterior latex paint, and may specify parameter values that result in the production of a batch of 100 gallons of a particular color of semi-gloss exterior latex paint.

By way of example only, a basic paint recipe may include one or more process steps that add colorants or other substances to a basic paint mixture and may further include additional process steps that mechanically blend these colorants and other substances into the basic paint mixture. The blending and mixing process steps, or any other process steps associated with the basic paint recipe, may be bound to specific pieces of equipment within the process control system. For example, a first mixing step may be bound to a first blender and a second mixing step may be bound to a second blender or, alternatively, if desired, the second mixing step may instead be bound to the first blender. Similarly, each process step of the recipe that adds colorant to the paint mixture may be bound to a particular piece of colorant dispensing equipment.

Furthermore, in defining a batch, a user may provide a variety of I/O parameter values such as blending times, colorant amounts, etc. that are used by the process control system during execution of the batch to carry out the process steps specified by the batch and to achieve a desired final paint product. A user can thus produce a variety of final paint products including a variety of basic paint types (as specified by basic recipes) in a variety of colors (as specified by I/O parameter values). Of course, because conventional batch definition techniques may also be used to create many other types of products such as pharmaceuticals, beverages, food products, etc., the particular process steps, equipment bound to the process steps and the I/O parameter values may he varied so that the process control system produces the desired final product.

In the recent years, batch execution environments have become significantly more complex. For example, many modern batch process plants run several parallel batches using multiple "equipment trains," or sets of operatively connected control equipment units necessary to physically perform a particular batch run. Recipes have also grown longer, with every procedural step in turn increasing in complexity. Meanwhile, measurement devices now yield better measurements of batch parameters and report these measurements in real-time or in near real-time to controllers and operator workstations. In particular, these measurement devices may quickly and accurately detect such abnormal conditions as, for example, excessive temperature, insufficient pressure, or an unexpectedly high concentration of a particular chemical. Operators understandably wish to respond to these conditions as quickly as possible in order to reduce product loss and to avoid harmful situations. As a result, the industry demands more flexibility from batch execution environments even as the task of controlling batches becomes increasingly more complex.

Moreover, some countries have also experienced changes in government regulation related to certain manufacturing methods. For example, the Food and Drug Administration of the United States (FDA) recently launched the so-called Process Analytic Technology (PAT) initiative. The stated goal of PAT is to control the manufacturing process in addition to final manufactured products. To comply with PAT requirements, manufactures must be able to assure quality at the intermediate steps of a corresponding manufacturing process and, of course, properly and timely respond to the detected conditions. Thus, modern batch execution environments must be flexible for both economic and regulatory reasons.

Unfortunately, the existing batch execution technology and methodology fall short of meeting these demands in a cost-effective manner. A typical process control system servicing a batch process plant maintains recipe information in a dedicated database. For every product, the database stores a "control recipe" which may include a procedural structure of the recipe, recipe parameters, a list of equipment units required by the recipe, and other recipe information. In response to an operator command or other predetermined condition, the process control system retrieves a particular control recipe from the database and applies the recipe to a selected "batch executive," or a subsystem responsible for executing one or more batch runs according to the received recipe. Each batch accordingly executes according to the commands and parameters of the received recipe.

Some attempts have been made in the recent years to increase the flexibility of batch execution environments. For example, the Emerson Process Management DeltaV™ interface tool allows operators to force transitions between steps of a recipe as part of the Active Step Change feature. This feature additionally allows operators to initiate a run of a certain phase of a recipe as a standalone batch. However, this aspect of the feature is limited to the original definition of the recipe. Moreover, the manual operation is permitted only on the phase level. To allow operators to synchronize running batches with new versions of the corresponding batch recipes, U.S. patent application Ser. No. 12/234,117 to Pettus et al. entitled "Online Recipe Synchronization in a Real-Time Batch Executive Environment" discloses, in part, a batch execution engine capable of accepting changes to currently running batches. The entire disclosure of the U.S. patent application Ser. No. 12/234,117 is hereby expressly incorporated by reference herein.

In another aspect, a batch executive environment such as the DeltaV batch system performs equipment arbitration to prevent and resolve conflicts that arise when one or than one batch attempts to secure the same resource. For example, U.S. patent application Ser. No. 10/972,192 to Sherriff et al. entitled "Method and System for Batch Process Arbitration in a Process Control System" discloses a system and a method for equipment arbitration in a process control system. The entire disclosure of the U.S. patent application Ser. No. 10/972,192 is hereby expressly incorporated by reference herein. However, additional flexibility in batch control and equipment arbitration may further improve the convenience and efficiency of batch executive environments.

SUMMARY OF THE DISCLOSURE

A batch execution environment operating in a process control system allows a user to define a recipe that includes dynamic input parameters. A batch executing the recipe can obtain a value for one or more dynamic input parameters at a transition from one step of the recipe to another step of the recipe or during the execution of a step, an operation, or a phase. By including one or several dynamic input parameters in a recipe, the user can reference values external to the recipe logic and thereby improve the flexibility of a batch executing the recipe. In particular, the user can include parameters in a recipe without always specifying a numeric value for each parameter or requiring a prompt for operator input. In another aspect, dynamic input parameters allow the batch to efficiently adjust to changing operating condition during runtime.

In an embodiment, a dynamic input parameter references a report value received from an equipment phase during the execution of the equipment phase or upon completion of the equipment phase. The batch executing a recipe that includes such dynamic input parameter receives the value from the corresponding equipment phase as part of a report and supplies the received value to a subsequent or parallel phase. In some embodiments, the batch supplies the received value to another level of recipe logic such as an operation, a unit procedure, or step transition logic at the highest level of the recipe.

In another embodiment, a dynamic input parameter references a value that the batch executive receives from an external module or host during the execution of the recipe. The value may arrive, for example, from a Laboratory Information Management System (LEMS), a web service, etc. The batch manager operating within the batch executive may receive the value in real-time and propagate the received value to one or several batch runners executing the recipe, or the batch runners may request the value via the batch manager when the value is required for the execution of the next step, operation, or phase.

In another embodiment, a recipe uses a dynamic input parameter that includes a reference path to a parameter associated with a unit of equipment. For example, a dynamic input parameter may refer to the volume of a mixing tank. Accordingly, the batch executing the recipe may retrieve the volume of the mixing tank at the beginning of recipe execution, when the mixing tank becomes available, or when the batch reaches the stage of recipe execution where the value corresponding to the volume of the mixing tank is required. Further, the recipe may refer to a specific unit or to a unit selected during runtime. A dynamic parameter may thus resolve to a particular value only after multiple runtime selections or calculations. Still further, the recipe may refer to a value associated with a unit class, a unit, an equipment or control module within a particular unit, or another level of the equipment hierarchy consistent with the generally accepted principles of batch manufacturing.

In some embodiments, the batch execution environment also allows a user to pre-define a set of one or more commands, setpoints, command parameters, etc. and associate the predefined set with a step at any level of a recipe, e.g., unit operation, unit procedure or procedure. The user can thus avoid forcing high-level logic to the phase level of the recipe to define and program actions currently available only at the low level of the standard recipe structure or at a process controller. In this manner, the user can save a configuration effort and achieve a greater flexibility in batch execution.

In an embodiment, a predefined command set may include an equipment arbitration request to be performed on the level of a unit procedure or an operation, for example. The batch executing a recipe that requires a certain equipment arbitration request as part of a step efficiently secures a physical resource prior to executing any of the phases of the operation. In this manner, the batch execution environment ensures that no other batch can interfere with a physical resource while the first batch is using this resource.

In an embodiment, a predefined command set may include a unit selection request to be performed on any level of recipe logic such as within a unit procedure or an operation, for example. By including a unit selection request at a selected location within the recipe logic, the user can configure the batch to evaluate several candidate units and select the unit most suitable for the particular procedure, operation, or phase. Further, a predefined command set may include both a unit selection request and a subsequent arbitration request to ensure that the batch can in fact secure the selected unit. Still further, a predefined command set may include a dynamic input parameter as part of a unit selection request so that the batch receives a value for a particular selection criteria during runtime or otherwise from logic external to the recipe.

In an embodiment, the batch execution environment of the present disclosure supports operator messages and prompts at any level of recipe hierarchy. In accordance with this embodiment, a batch executing a recipe may display prompts at a transition from one step of the recipe to another step of the recipe, for example. Thus, unlike the known systems that restrict operator messages and prompts to the phase level only, the batch execution environment reduces the configuration effort required to create a recipe because the operator message or prompt may originate at higher-level steps of the recipe.

In another embodiment, a batch execution environment allows a user to select an equipment or control module and define a set of commands for the selected module. In at least some of the embodiments, the user can associate various commands or one or more setpoints with different modes of operation of the module as part of the command set. When creating a recipe, the same or different user can select the command set, select the desired mode of operation for use in a particular recipe, and efficiently insert the command set at any level of the recipe logic. Accordingly, the batch executing the recipe may send the relevant subset of the defined set of commands to the corresponding equipment module. In this manner, the user need not channel commands or setpoints to the equipment via unit phases. Instead, the user may configure sets of commands to run directly on equipment or control modules, for example.

In another embodiment, a batch execution environment supports recipes that mechanism. For example, the batch execution environment may send messages to a Manufacturing Execution System (MES). In particular, a batch executing in a process control system according to a recipe may initiate a communication step at the procedural level (i.e., uppermost) of the recipe logic, transmit a message to an MES as part of the communication step, and suspend execution until an acknowledgement from the MES arrives at the process control system. In this manner, the batch execution environment of the present disclosure eliminates the need to continuously monitor batch exaction at a MES.

DETAILED DESCRIPTION

Figure 1:
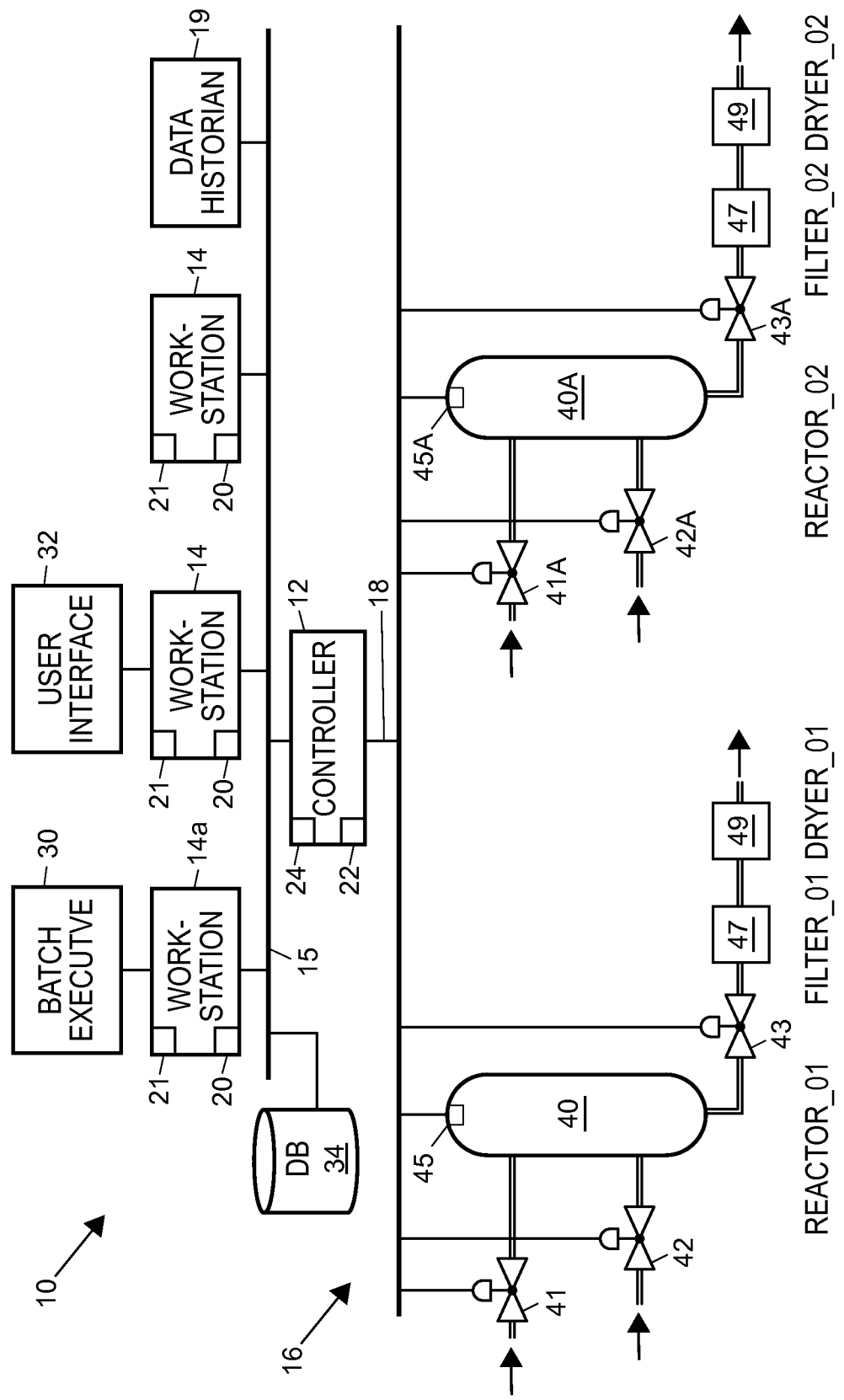
FIG. 1 is a partial block diagram, partial schematic diagram of a portion of a process control network in which a batch execution environment consistent with one embodiment of the present disclosure may implement dynamic recipe steps.

Referring to FIG. 1, a process plant control network or system 10 includes a process controller 12 coupled to numerous workstations 14 via, for example, an Ethernet communications connection 15. The controller 12 is also coupled to devices or equipment within a process plant (generally designated by the reference numeral 16) via an input/output (I/O) device (not shown) and a set of communication lines or a bus 18. The controller 12, which may be by way of example only, the DeltaV™ controller sold by Fisher-Rosemount Systems, Inc., is capable of communicating with control elements, such as field devices and function blocks within field devices distributed throughout the process plant 16 to perform one or more process control routines to thereby implement desired control of the process plant 16. These process control routines may be continuous or batch process control routines or procedures. The workstations 14 (which may be, for example, personal computers, servers, etc.) may be used by one or more engineers or operators to design process control routines to be executed by the controller 12, to communicate with the controller 12 so as to download such process control routines, to receive and display information pertaining to the process plant 16 during operation of the process plant 16 and to otherwise interact with the process control routines executed by the controllers 12. Additionally, a data historian 19 may be connected to the LAN 15 and may automatically collect and store data generated within the plant 50, including within the controller 12, the field devices within the process plant 16 and even the workstations 14, in any known or desired manner.

Each of the workstations 14 includes a memory 20 for storing applications, such as configuration design applications, and for storing data, such as configuration data pertaining to the configuration of the process plant 16. Each of the workstations 14 also includes a processor 21 that executes the applications to, among other things, enable a user to design process control routines and download those process control routines to the controller 12. Likewise, the controller 12 includes a memory 22 for storing configuration data and process control routines to be used to control the process plant 16 and includes a processor 24 that executes the process control routines to implement a process control strategy. If the controller 12 is a DeltaV controller, it, in conjunction with one or more applications on one of the workstations 14, may provide a graphical depiction of the process control routines within the controller 12 to a user illustrating the control elements within the process control routine and the manner in which these control elements are configured to provide control of the process plant 16.

The process control system of FIG. 1 may be used to implement batch processes to generate products according to product recipes. For example, one of the workstations 14 may execute a batch executive that implements and coordinates batch runs within the process plant 16. In operation, the batch executive 30 supplies each batch run with a recipe that typically includes an ordered set of actions separated by transitional logic. As discussed in greater detail below, the ordered set of actions corresponds to a hierarchical structure so that each recipe includes one or several steps, each step includes one or several operations, and each operation includes one or several phases. In accordance with the methods and structural elements of the present disclosure, the batch executive 30 supports dynamic input parameters that allow recipes to reference values outside the recipe logic or to obtain parameter values during runtime from previous or parallel phases of recipe execution. In other words, a user such as a process engineer or otherwise properly authorized operator may access the batch executive 30 via user interface at one of the workstation 14, create a recipe that specifies a series of actions (e.g., pour ingredients into a vessel, mix, pour into a mold, heat, etc.), various fixed parameters corresponding to certain actions (e.g., 100 liters of water, mix for 10 minutes, etc.), and various dynamic parameters corresponding to these or other actions (e.g., pour dough into mixer #5 in the amount reported by the previous phase, apply heat for the number of minutes equal to 1.25* pressure measured by the sensor #27, select a tank and fill the selected tank to 50% of the capacity of the tank, etc.). To further improve flexibility, the batch executive 30 allows the user to define sets of commands or setpoints and associate these sets with any level of recipe hierarchy. These and other related functions of the batch executive 30 are discussed in detail below.

Still referring to FIG. 1, the batch executive 30 resides in the workstation 14*a* in this exemplary configuration of a process control system. In other embodiments, the batch executive 30 could be stored and executed in other workstations 14, or in other computers communicatively connected to the bus 15 or the bus 18 in any desired manner, including in any wireless manner. Likewise, as discussed in more detail with respect to FIG. 5, the batch executive 30 may be divided into various components or be associated with various components stored in and executed in different computers or workstations within the process plant 16.

Additionally, it will be appreciated that the process plant control network 10 may include more than one batch executive 30. For example, modern plants currently support up to 4 batch executives sharing some or all of the resources of the process plant control network 10. One or more batch executives 30 may be generally referred to as a batch subsystem. By contrast, a configuration subsystem refers to user interface tools, configuration databases, and other hardware, firmware, and software modules used for defining and editing recipes, monitoring the performance of batch runs, and other administrative purposes. It will be noted that in the present discussion, the terms "batch executive" and "batch subsystem" are used interchangeably.

In operation, a user may operate a batch operator interface ("BOI") 32 to define recipes, create batches executing the recipes, and control batch execution. Specifically with respect to controlling batch execution, the BOI 34 may allow users to start, stop, pause, and update batch runs. The BOI 34 may interact with the batch subsystem 30 via the Ethernet link 15, over a wireless link, or in any other known manner. Although FIG. 1 schematically depicts the BOI 34 as part of the workstation 14, other implementations and arrangements are equally possible. For example, the BOI 34 may also run on the workstation 14*a*, on a portable device (not shown), or on a host disposed outside the process plant control network 10. Further, there may be several instances of the BOI 34 instantiated on various hosts in the process plant control network 10 simultaneously supporting multiple operators. Still further, it will be appreciated that the process plant control network 10 may provide more than one user interface means for accessing recipe configuration and batch operations. The DeltaV™ system, to take one example, provides user interface through such components as DeltaV Operate and DeltaV Batch Operator Interface, among others.

Referring again to FIG. 1, a configuration database 34 may store the recipes for the batch subsystem 30, equipment data such as a list of equipment units in the plant and equipment hierarchy, administrative information related to various areas of the plant, association of equipment units with plant areas, hierarchical breakdown of equipment, and other configuration data. The configuration database 34 may reside in a configuration subsystem separate from the batch subsystem 30. Also, it will be noted that the configuration database 34 may be a separate server or a group of servers or, if the process plant control network 10 is sufficiently small, the configuration database 34 may be implemented simply as a dedicated process servicing part of the file system of the workstation 14 or 14a.

In the example process plant control network 10 illustrated in FIG. 1, the controller 12 is communicatively connected via the bus 18 to two sets of similarly configured equipment, each set of equipment having a reactor unit referred to herein as Reactor_01 (R1) or Reactor_02 (R2), a filter unit referred to herein as Filter_01 (F1) or Filter_02 (F2) and a dryer unit referred to herein as Dryer_01 (D1) or Dryer_02 (D2). Reactor_01 includes a reactor vessel 40, two input valves 41 and 42 connected so as to control fluid inlet lines providing fluid from, for example, a headtank (not shown) into the reactor vessel 40 and an output valve 43 connected so as to control fluid flow out of the reactor vessel 40 via an outlet fluid line. A device 45, which can be a sensor, such as a temperature sensor, a pressure sensor, a fluid level meter etc. or some other equipment such as an electrical heater or a steam heater, is disposed in or near the reactor vessel 40. The Reactor_01 is coupled via the valve 43 to the Filter_01 having filter equipment 47 which, in turn, is coupled to the Dryer_01 having dryer equipment 49. Similarly, the second set of equipment includes the Reactor_02 which has a reactor vessel 40A, two input valves 41A and 42A, an output valve 43A and a device 45A. The Reactor_02 is coupled to the Filter_02 having filter equipment 47A which, in turn, is coupled to the Dryer_02 which has dryer equipment 47A. The filter equipment 47 and 47A and the dryer equipment 49 and 49A may have additional control elements (such as heaters, conveyor belts and the like), sensors, etc. associated therewith. If desired, although not shown, each of the filter units Filter_01 and Filter_02 may be physically coupled to each of the reactor units Reactor_01 and Reactor_02 while each of the dryer units Dryer_01 and Dryer_02 may be coupled to each of the filter units Filter_01 and Filter_02 so that a batch run using one of each of a reactor, a filter and a dryer may use any combination of the equipment illustrated in FIG. 1.

As illustrated in FIG. 1, the controller 12 is communicatively coupled to the valves 41-43, 41A-43A, to the devices 45, 45A, to the filters 47, 47A and to the dryers 49 and 49A (and to the other equipment associated therewith) via the bus 18 to control the operation of these elements (which may be units, field devices, etc.) to perform one or more operations with respect to these elements. Such operations may include, for example, filling the reactor vessels, or dryers, heating the material within the reactor vessels or dryers, dumping the reactor vessels or dryers, cleaning the reactor vessels or dryers, operating the filters, etc. Of course, the controller 12 could be coupled to the elements within the process plant 16 via additional busses, via dedicated communication lines, such as 4-20 ma lines, HART communication lines, etc.

The valves, sensors and other equipment illustrated in FIG. 1 may be any desired kind or type of equipment including, for example, Fieldbus field devices, standard 4-20 ma field devices, HART field devices, etc. and may communicate with the controller 12 using any known or desired communication protocol such as the Fieldbus protocol, the HART protocol, the 4-20 ma analog protocol, etc. Still further, other types of devices may be connected to and be controlled by the controller 12 in any desired manner. Also, other controllers may be connected to the controller 12 and to the workstations 14 via, for example, the Ethernet communication line 15 to control other devices or areas associated with the process plant 16 and the operation of such additional controllers may be coordinated with the operation of the controller 12 illustrated in FIG. 1 in any desired or known manner.

A user may define and edit recipes, configure equipment, form equipment trains from process control equipment such as devices valves 41-43 and a vessel 40, associate the equipment trains with batches and interact with the batch subsystem 30 via the BOI 34 or other interface tools. The BOI 34 may retrieve the status of each batch running in the system either periodically or in real time. The batch execution environment of the network 10 and, in particular, the batch subsystem 30 working in cooperation with the BOI 34, allows the user to configure a recipe with dynamic parameters and predefined command steps.

Figure 2:
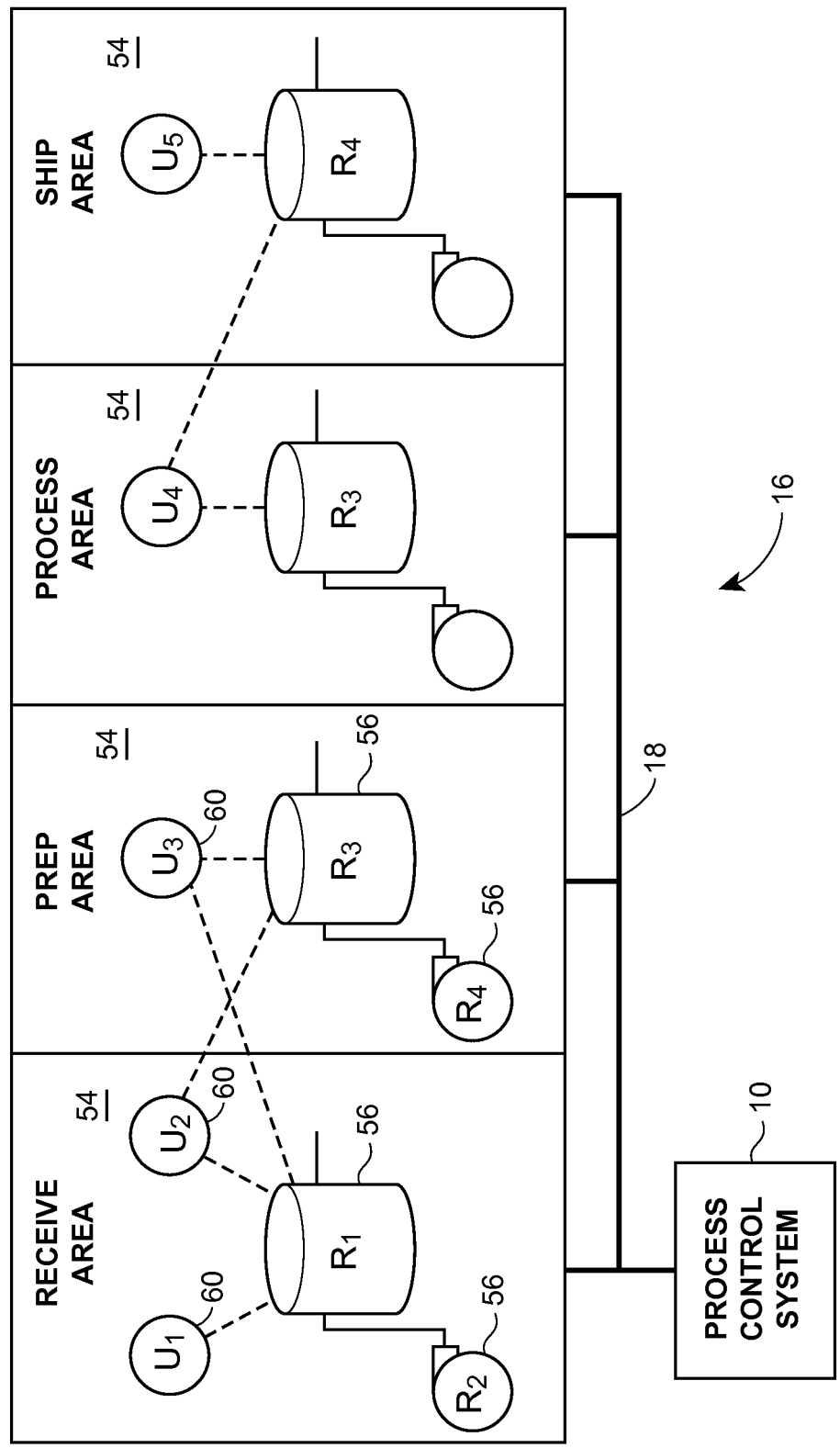
FIG. 2 is a block diagram illustrating a manufacturing environment in which manufacturing equipment associated with several logical or geographic areas interacts with a process control system.

To better demonstrate the relationship between a process control system and process control equipment used for simultaneous batch runs, FIG. 2 illustrates the process plant 16 of FIG. 1 from the perspective of equipment organization (according to a logical or geographic principle, for example) and equipment arbitration. In particular, the process plant 16 includes one or more areas 54, one or more resources 56, and one or more resource users 60. The areas 54 represent a logical and/or physical organization of the process plant 16, the resources 56 and the resource users 60. The areas 54 are generally used to organize resources 56 used in performing the steps of the recipes used in the plant 16. The organization of the areas 54 may be based on the physical location of the resources 56 in the plant 16, a logical organization of the resources 56 in the plant 16, or a combination of the physical and logical organization of the resources 56 as suitable. For example, a batch processing operation may be broken up into separate areas 54 for receiving, preparation, processing and shipping. For example, raw materials for a pharmaceutical creation process may be received in a receiving area, changed in a preparation area, combined and processed to create the target pharmaceutical in a process area, with the target pharmaceutical then being packaged and shipped from a shipping area. The resources 56 in the areas 54 may be used as part of the production of different types of end products, such as various equipment used to create different pharmaceuticals. In one embodiment, the areas 54 also provide a practical solution to the problem of having too many resources 56 and resource users 60 for system 10 to handle as a single group. The areas 54 may be used to split up the processing of large recipes so that the process control system 10 is not slowed by being required to manage a large number of resources 56 while performing other process monitoring duties. For example, the processing capabilities of the control system 52 may overwhelmed due to the large number of interactions to be managed across the entire plant 16, and dividing the entire plant 16 into separate areas 54 decreases the number of interactions.

The resources 56 may respectively comprise a valve, tank, pump, conveyer belt, mixer, heater, or other suitable device usable as part of the processes performed in plant 50. The resources 56 may, at various times, be used in different portions of the batch process by different resource users 60. For example, a particular heater resource 56 may be used with a first substance for one end product, cleaned, and then later used with a second substance for a different end product.

The resource users 60 represent physical or logical entities that use the resources 56. For example, a user 60 may represent a particular recipe being executed by the process control system 10 that uses the resources 56 in a particular order to produce a particular product. The resource users 60 may themselves be resources 56. For example, a pump resource may act as a resource user when requesting access to a tank resource so that the pump resource can fill the tank resource with a particular material. Further, the resource user 60 may represent materials used as part of the production process itself, such as raw materials. For example, a first substance currently being stored in a tank may request access to a pump to move the first substance to a heater as part of a recipe. Also, a resource user 60 may be a human or other entity not directly controlled by the process control system 10, but that may request access to the resources 56 from the process control system 10. In general, the resource user 60 may be human, material, hardware, software and/or other resource 56 used by the plant 16 to produce products under the control of the process control system 12.

In operation, one or more human users (not shown) may configure, control and monitor the execution of one or more recipes, batch processes or other processes using the process control system 10. The recipes are performed using the resources 56 available at the process plant 50 to generate one or more desired end-products. The process control system 12 is responsible for controlling access to resources 56 by resource users 60 so that two users 60 do not attempt to use the same resource 56 simultaneously. Simultaneous use of the same resource 56 for different recipes may cause contamination of the materials being processed and may require that the products be discarded, or have other negative results. The process control system 10 controls access to the resources 56 by arbitrating between requests from users 60 to use the resources 56 as is described in more detail in the U.S. patent application Ser. No. 10/972,192, for example.

As indicated above, the batch subsystem 30 includes a high level control routine that enables a user to specify a number of batch runs to be performed within the process plant and that sets up a number of different batch runs or batch processes to operate essentially independently within the process plant control network 10 to implement the different batch runs. Each such batch process directs the operation of one or more unit procedures, which are subroutines or processes that operate on a single unit, such as one of the reactor units, the filter units, the dryer units, or other equipment within the process plant. Each unit procedure (which is a part of a batch run that is generally run on one of the workstations 14) may perform a series of operations, each of which may perform one or more phases on a unit. For this discussion, a phase is the lowest level action or step performed on a unit and is typically implemented or executed in one of the controllers 12, an operation is a set of phases that performs a particular function on the unit and is typically implemented or executed on one of the workstations 14 by calling a series of phases within the controller 12, while a unit procedure is a series of one or more operations performed on a single unit and is typically implemented as a set of operation calls on one of the workstations 14. As a result, any unit procedure can include one or more phases and/or one or more operations. In this manner, each batch process performs different steps or stages (i.e., unit procedures) needed to produce a product, such as a food product, a drug, etc.

To implement different unit procedures, operations and phases for an individual batch, a batch process uses what is commonly referred to as a recipe which specifies the steps to be performed, the amounts and times associated with the steps and the order of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch, running a filter to filter the output of a reactor and then running a dryer to dry the product created in the reactor vessel. Each of the series of steps associated with a different unit defines a unit procedure of the batch and the batch process will execute a different control algorithm for each one of these unit procedures. Of course, the specific materials, amounts of materials, heating temperatures and times, etc. may be different for different recipes and, consequently, these parameters may change from batch run to batch run depending on the product being manufactured or produced and the recipe being used. Those skilled in the art will understand that, while control routines and configurations are described herein for batches using the reactor units, the filter units and the dryer units illustrated in FIG. 1, control routines may be used to control other desired devices to perform any other desired batch process runs or to perform continuous process plant runs, if so desired.

As will also be understood by those skilled in the art, the same phases, operations or unit procedures of a generic batch process can be implemented on each of the different reactor units of FIG. 1 at the same or at different times as part of different actual batch processes. Furthermore, because the reactor units of FIG. 1 generally include the same number of and types of equipment (i.e., they belong to the same unit class), the same generic phase control routine for a particular phase may be used to control each of the different reactor units, except that this generic phase control routine has to be modified to control the different hardware or equipment associated with the different reactor units. For example, to implement a fill phase for Reactor_01 (wherein the reactor unit is filled), a fill control routine will open one or more of the input valves 31 or 42 for a certain amount of time, for example, until the fluid level meter 45 senses that the vessel 40 is full. However, this same control routine may be used to implement a fill phase for Reactor_02 by merely changing the designation of the input valve(s) to be the valves 41A or 42A instead of the valves 41 or 42 and by changing the designation of the fluid level meter to be the fluid level meter 45A instead of the fluid level meter 45.

Figure 3:
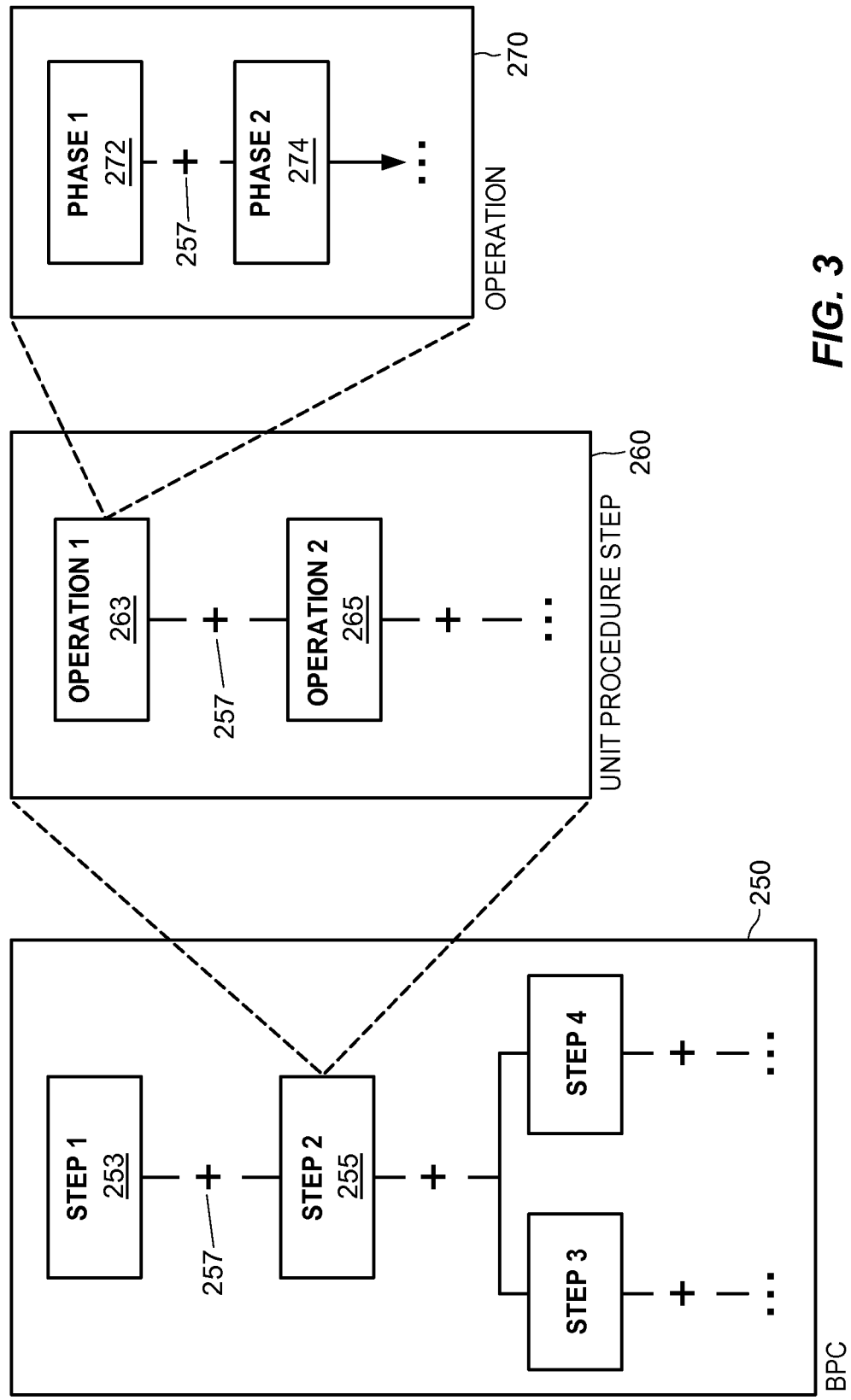
FIG. 3 is a block diagram illustrating the nested structure of a recipe consistent with the S88 standard.
Figure 4:
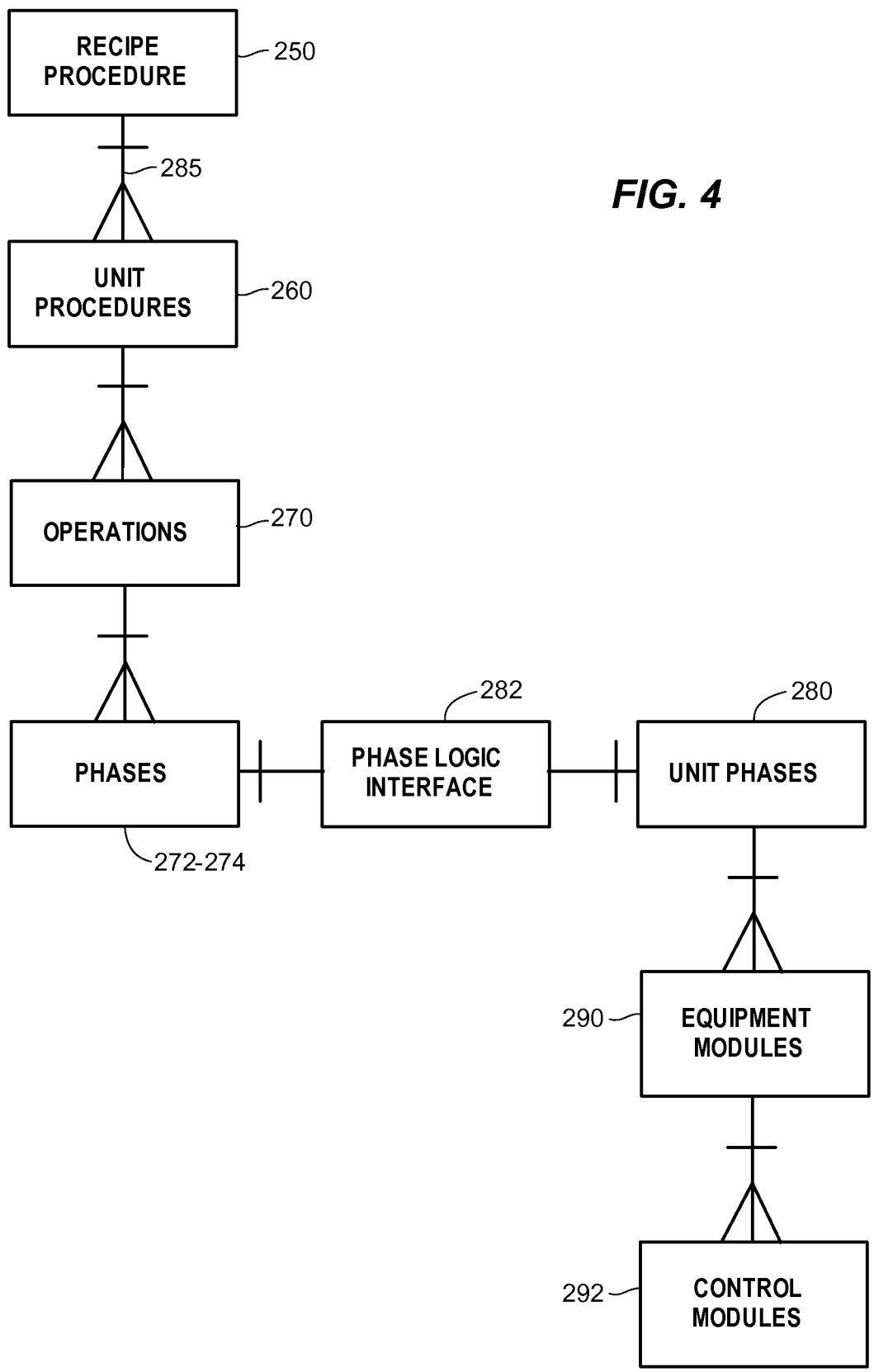
FIG. 4 is a block diagram illustrating the relationship between a recipe and equipment used by phases of the recipe according to the general principles of batch execution control.
Figure 5:
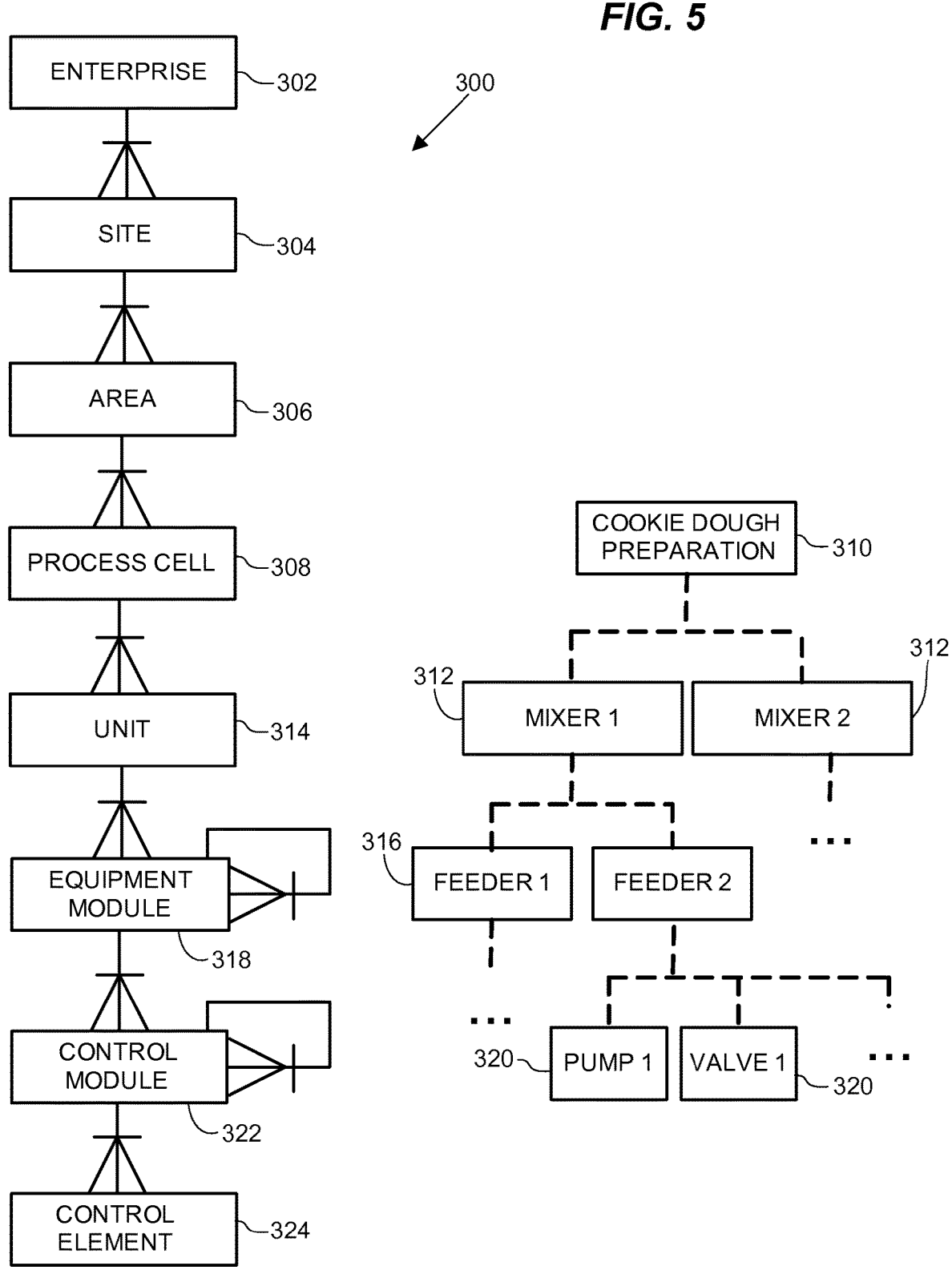
FIG. 5 is a block diagram illustrating the relationship between the hierarchy of equipment entities consistent with the general principles of batch execution control and several example equipment entities operating in a manufacturing environment.

Although the logic associated with the general operation of batch runs is well known, FIGS. 3-5 provide a summary overview of a structure of a typical recipe, of the interaction between a recipe and corresponding manufacturing equipment, and the equipment hierarchy consistent with the general principles of batch manufacturing.

In particular, FIG. 3 illustrates a recipe structure relevant to the method of online recipe synchronization in a batch execution environment. A recipe 255 is compliant with the hierarchical structure of the S88 standard. However, one skilled in the art will appreciate that the method of online recipe synchronization may also apply to other existing and future recipe definition standards. As illustrated in FIG. 3, the recipe 255 includes one or more steps, such as steps 253 and 255, separated by transitions 257. Each of the steps of the recipe 255 may have a complex internal structure and may be defined as a separate unit procedure. For example, the step 255 may be defined as a unit procedure 260.

The transition 257 may specify a condition which must be met within the step 253 prior to performing the step following the transition 257 (in this case, the step 255). For example, the step 253 may perform a mixing of two chemicals, and the condition 257 may check whether the mixing has exceeded a 2-minute time limit. As another example, the transition 257 may be set to Boolean "true" in order to affect transition regardless of the result of executing step 253. In general, the conditions may be simple or compound, and may include Boolean operands such as "and" and "or". The unit procedure 260 may, in turn, include one or more operations 263 or 265 similarly separated by conditions 257.

In the example illustrated in FIG. 3, the operation 261 is implemented according to an operation definition 270. The operation definition 270 may include or more phases 272 and 274 separated by conditions 257.

Referring to FIG. 4, the recipe 250 may interact with unit phases 280 via a phase logic interface 282. For the purposes of clarity, FIG. 4 also includes a generic representation of the recipe 250 as a recipe procedure including one or more unit procedures 260 which, in turn, may include one or more operations 270 having one or more phases 272-274. As used herein, the symbol 285 schematically represents a one-to-many relationship between two classes or instances. As illustrated in FIG. 4, each unit phase 280 involves (i.e., executes on) one or several equipment modules 290, each encapsulating one or several control modules 292.

Generally, a control module 292 includes a grouping of devices that operate as a single logical entity in a process control system. For example, an interconnected group of elements including a controller, a valve actuator operating on a certain valve, and a flowmeter for feedback control may define a single control module because, from a high-level perspective, these devices may provide a specific control function in the process control system 10.

Meanwhile, an equipment module 290 performs a certain processing function that includes sequencing, i.e., multiple control functions. For example, a certain equipment module 290 may include a control module 292 that provides PM-controlled flow through a certain pipeline and another control module 292 that selectively directs the controlled flow to one of several destination pipelines. As another example, an equipment module 290 may be a material feeder that includes several control modules 292 such as a pump control module and a valve control module, for example.

With continued reference to FIG. 4, the recipe 250 interacts with the unit phases 280 by sending commands and receiving reports via the phase logic interface 282. Each report may include a simple Boolean result of the phase execution or may convey one or several numerical measurements or other values generated during the phase execution. Generally, the equipment phases 280 support only phase logic using Programmable Logic Controllers (PLCs) or Distributed Control System (DCS) components. As is known, a unit phase 280 may execute on a unit to define a unit phase or on an equipment module to define an equipment module phase, also referred to as an "equipment phase." Thus, the recipe 250 and the equipment involved in executing a batch according to the recipe 250 interact by exchanging commands and real-time or post-time reports.

Now referring to FIG. 5, a complete equipment hierarchy 300 includes an enterprise level 302 which may correspond to a company or another type of a business organization. An enterprise node 302 may include several sites or process plant locations 304. Due to a large size of a typical process plant, each site 304 may be further divided into areas 306. An area 306 may in turn include several process cells 308.

With continued reference to FIG. 5, a process cell 308 may correspond, for example, to a cookie dough preparation stage 310 in an automated cookie manufacturing plant. The stage 310 may include two mixers 312 which correspond to units 314 in the hierarchy 300. Further, each mixer 312 may include one or several feeders 316 corresponding to equipment modules 318, and each feeder 316 may include one or several pumps or valves 320 that are control modules 322. Finally, as illustrated in FIG. 5, control module 322 typically includes one or several control elements 324 (e.g., flowmeters, pressure sensors, etc.)

Thus, as discussed above with reference to FIGS. 3-5, the process control system 10 illustrated in FIGS. 1 and 2 may control batch execution within the process plant 16 in accordance with the generally accepted conventions and principles of batch manufacturing. More specifically, the process control system 10 supports recipes consistent with the structure illustrated in FIG. 3 and organizes the equipment according to the hierarchy illustrated in FIGS. 4 and 5. However, it will be appreciated that the process control system 10 may similarly support the dynamic input parameters and predefined command steps of the present disclosure in other batch execution environments that may be inconsistent or only partially consistent with the S88 standard. Thus, while the dynamic input parameters and predefined command steps shall be discussed below in reference to the process control system 10 generally consistent with the principles illustrated in FIGS. 3-5, it will be appreciated that the process control system 10 and the process plant 16 are only one example of an environment to which these methods may apply.

Figure 6:
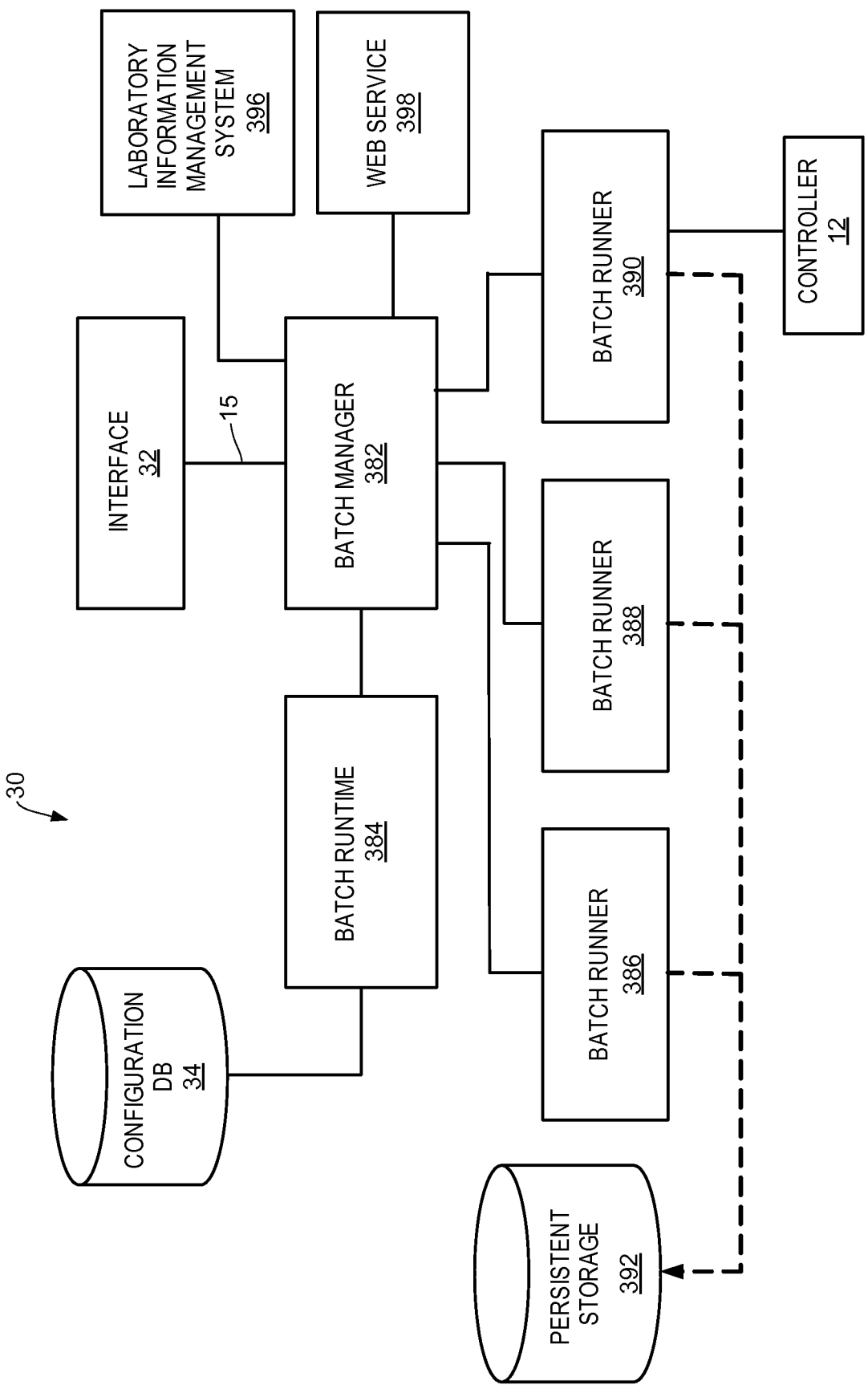
FIG. 6 is a block diagram illustrating an exemplary architecture of a batch subsystem interacting with a configuration subsystem and several external systems in a batch execution environment.

FIG. 6 illustrates an exemplary architecture of the batch subsystem 30 in the process plant control network 10. The batch executive subsystem 30 may interact with a user interface tool such as the BOI 30 via the Ethernet communications connection 15 or, if the batch subsystem 30 and the user interface 30 reside on the same workstation 14 or 14a, via one of the known inter-process communication (IPC) means. The batch subsystem 30 may include a batch manager 282, a batch runtime process 284, and one or batch runners 386-390. Each of the components of the batch subsystem 30 processes may be implemented as an independent process or a thread. As indicated above, the batch subsystem 30 may be distributed over several workstations or other hosts.

Each of the batch runners 386-390 executes exactly one batch. Some of the batch runners 386-390 may run the same recipe such as, for example, the recipe 250. It will be appreciated that the batch runners 386-390 need not be in the same state of execution at all times even if each of the batch runners is executing the same recipe. In the example illustrated in FIG. 6, the batch runner 290 is connected to the controller 12 via the Ethernet connection 15. In operation, the batch runner 390 may execute the logic on the level of unit procedures and operations in the process space on the corresponding workstations 14 or 14a. However, the batch runner 390 loads the phases 272 and 274 of each operation into the controller 12.

Referring again to FIG. 6, a persistent storage unit 392 may retain state, transition, and parameter information related to each of the batch runners 386-390. The persistent storage 392 may be a hard disk drive of one of the workstations 14 or 14a, an external storage device such as a CD or DVD, or other known data storage devices. The batch manager 382, the batch runtime process 384, and each of the batch runners 386-390 may have access to the persistent storage 392 via the Ethernet connection 15 or through IPC calls if the persistent storage 392 resides on the same host. In operation, each of the batch runners 386-390 saves information related to the execution status of the corresponding batch. For example, the batch runner 390 may record the state of the currently running unit procedure, operation, and phase. Thus, a record in the persistent storage unit 392 may at some point indicate that the batch runner 390 is currently executing step 3, operation 1, phase 2 of the recipe 250. Additionally, the record may specify the state of the each of the levels, such as RUNNING, HELD, or ABORTED, for example. Further, the batch runner 390 may record the values of parameter passed into a unit procedure, operation, and phase. The batch runner 390 preferably updates the persistent storage unit 392 in substantially real time.

Additionally, the batch runner 390 may record each transition 257 between, for example, steps 253 and 255, operations 263 and 265, and phases 272 and 274. The transition may be recorded in the persistent storage 292 along with the state and parameter information. Alternatively, state transitions may be recorded as separate event logs stored in the data historian 19. Event logs may also include some or all of the parameter information and such additional information as timestamps associated with each transition, error conditions, and other information useful for monitoring or debugging the system in post-time. The event logs may similarly store synchronization indications. For example, a certain record in the event log may indicate that the batch runner 390 resynchronized with the version v2 of a recipe "Chocolate_Cookie_001" at step 3, operation 1, phase 1 at 14:25 p.m. on September, 21

As indicated above, the hatch manager 382 controls the execution of the hatch runners 386-390. In particular, the batch manager 382 sends commands to the batch runners 386-390 indicating to the batch runners when to start, stop, or pause execution. Additionally, the batch manager 382 reports the status of each of the batch runners 386-390 to an operator via the user interface tool 380. For example, the batch manager 382 may access the persistent storage 392 to retrieve the state of the batch runner 390 and may report the state to the interface tool 380 in form of a message consistent with a well-known format such as XML or a special purpose format defined specifically for the interaction between the elements of the batch subsystem 30. In this sense, the batch manager 382 serves as a centralized gateway to all batch runners.

In one embodiment, the batch manager 382 and the batch runners 386-390 additionally have access to a shared memory region storing copies of the recipe currently being executed by the batch subsystem 30. The shared memory region may be a persistent or volatile memory location and may be disposed inside or outside the batch subsystem 30. In some embodiments, the batch manager 30 saves a copy of each recipe prior to triggering a run of the recipe by one of the batch runners 386-390. In another embodiment, an individual batch runner saves a copy of the recipe in its own process space or in a permanent location unknown or inaccessible to the rest of the batch subsystem 30. In either case, the batch subsystem 30 may store each recipe as a single file or as an hierarchical structure of elements. Preferably, the batch manager 382 and each of the batch runners 386-390 have means of accessing individual recipe elements such as unit procedures, operations, and phases for reading and writing.

Meanwhile, the batch runtime process 384 serves as an interface with the rest of the process plant control network 10. In particular, the batch runtime 384 may interact with the configuration database 34 through recipe download scripts. In one embodiment, the user interface 32 packages recipes in XML in order to allow for both human and machine readability. Alternatively, the user interface 32, the batch subsystem 30, and the configuration database 34 may send script information over any standard or proprietary protocol. The batch runtime process 384 may be also responsible for such functions as maintaining system security and log maintenance. Moreover, the batch runtime process 384 may record start, stop, and other relevant high-level information in the persistent storage 392 or in the configuration database 34.

With continued reference to FIG. 6, the batch manager 382 may also communicate with a Laboratory Information Management System (LIMS) 396 and a web service 398. The LIMS 396 may reside in a separate area and communicate with the batch manager 382 via an Ethernet or Internet connection, for example. The LIMS 396 may supply measurements, setpoints, or other types of values to the batch executive 30 for use in some or all of the recipes in the configuration database 34. Similarly, a web service 398 may supply data from remote operators, for example, and the batch executive 30 may also use the values received from the web service 398 in the recipes. It is noted that each of the LIMS 396, web service 398, or any other external module connected to the batch manager 382 may provide data in real time or in response to polling or a query initiated by one of the batch runners 386-390.

Figure 7:
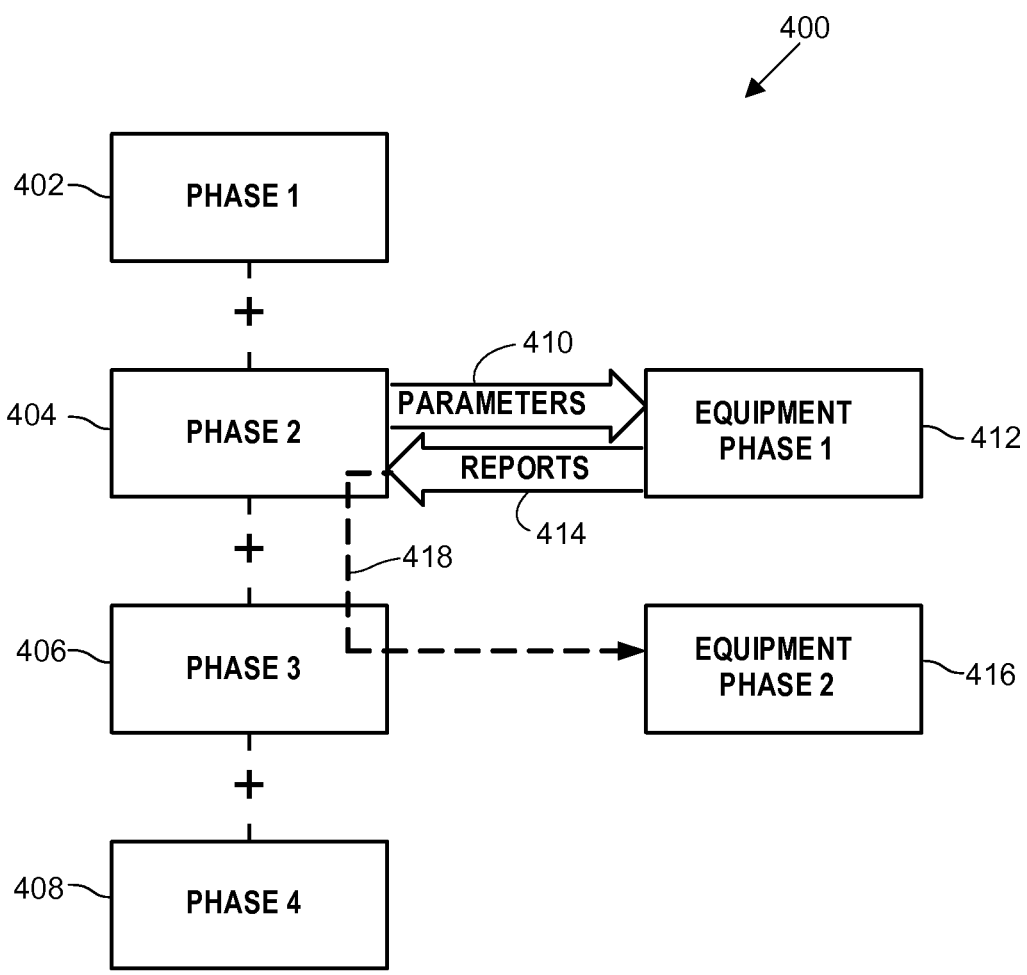
FIG. 7 is a block diagram illustrating the use of a reporting parameter generated by one equipment phase as an input parameter to another equipment phase.
Figure 8:
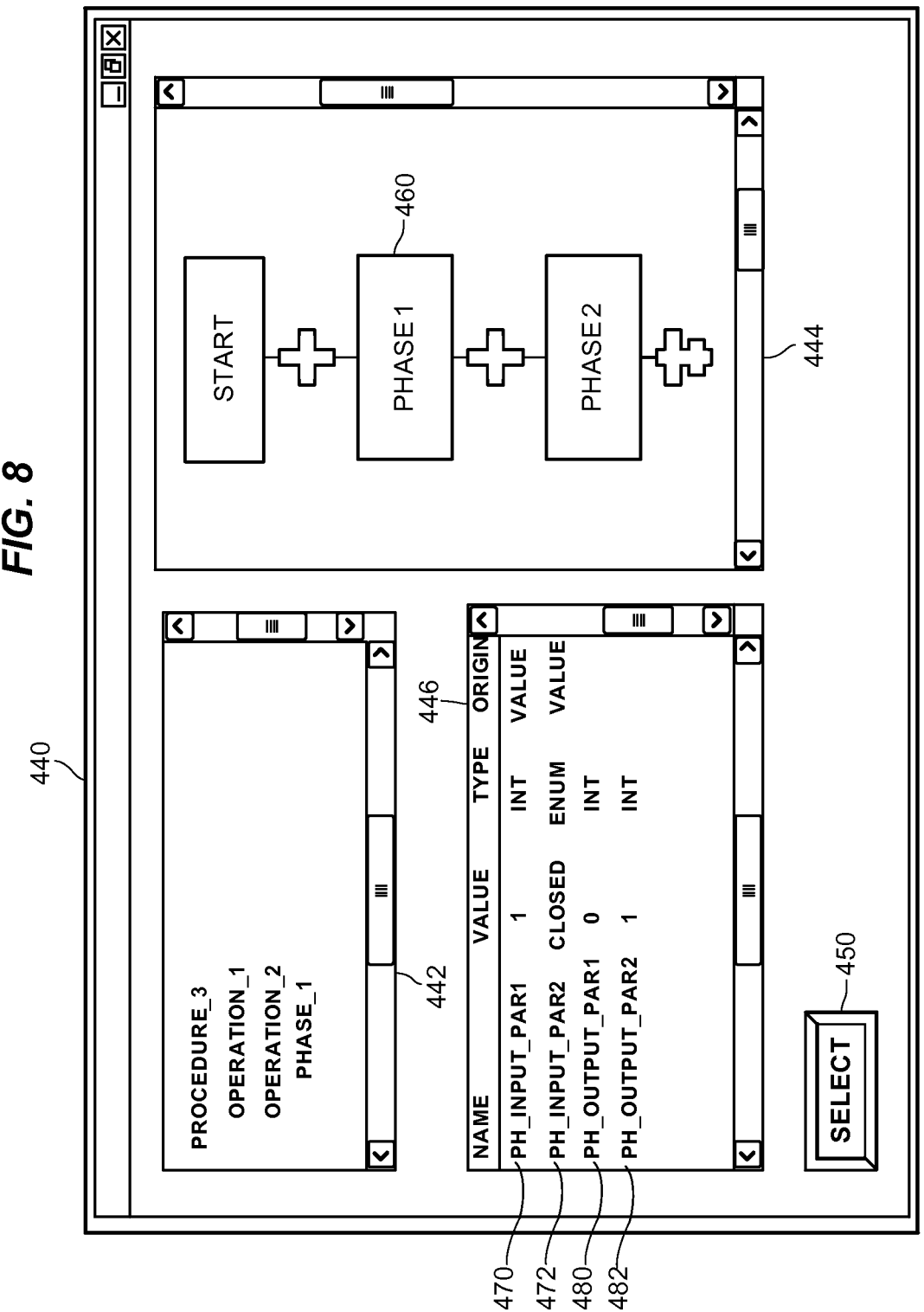
FIG. 8 is an example interface screen that the batch execution environment of the present disclosure may present to a user for manipulating input and output parameters of a particular phase.
Figure 9:
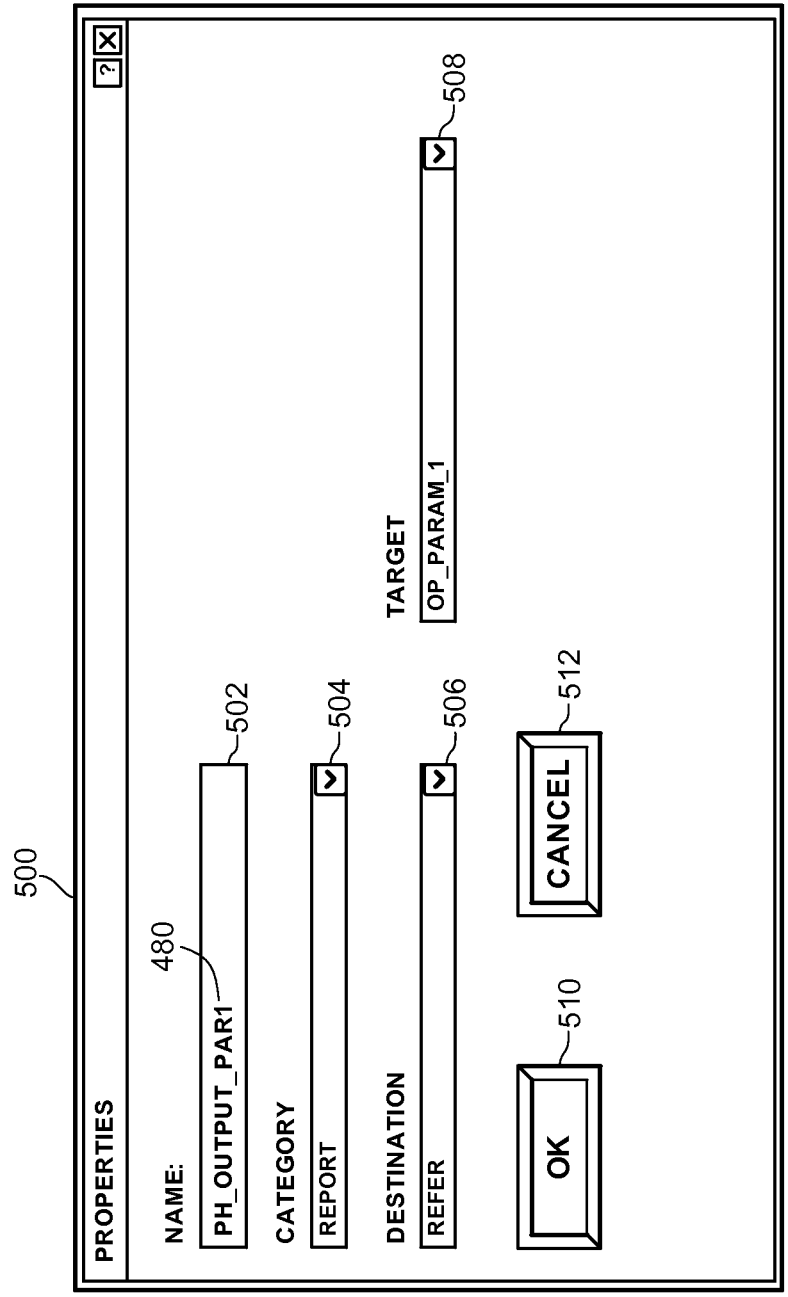
FIG. 9 is an example interface screen that the batch execution environment of the present disclosure may present to a user for associating a report parameter of a certain phase with an operation-level parameter.
Figure 10:
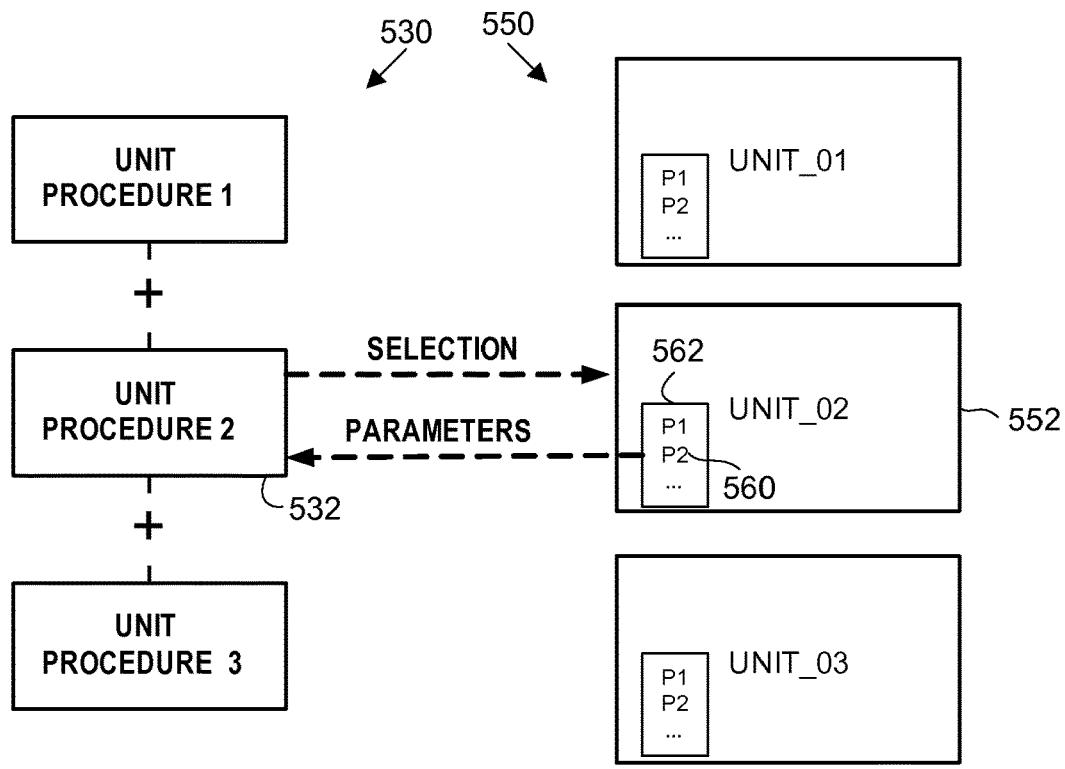
FIG. 10 is a block diagram illustrating a dynamic selection of a parameter specific to a unit of equipment.
Figure 11:
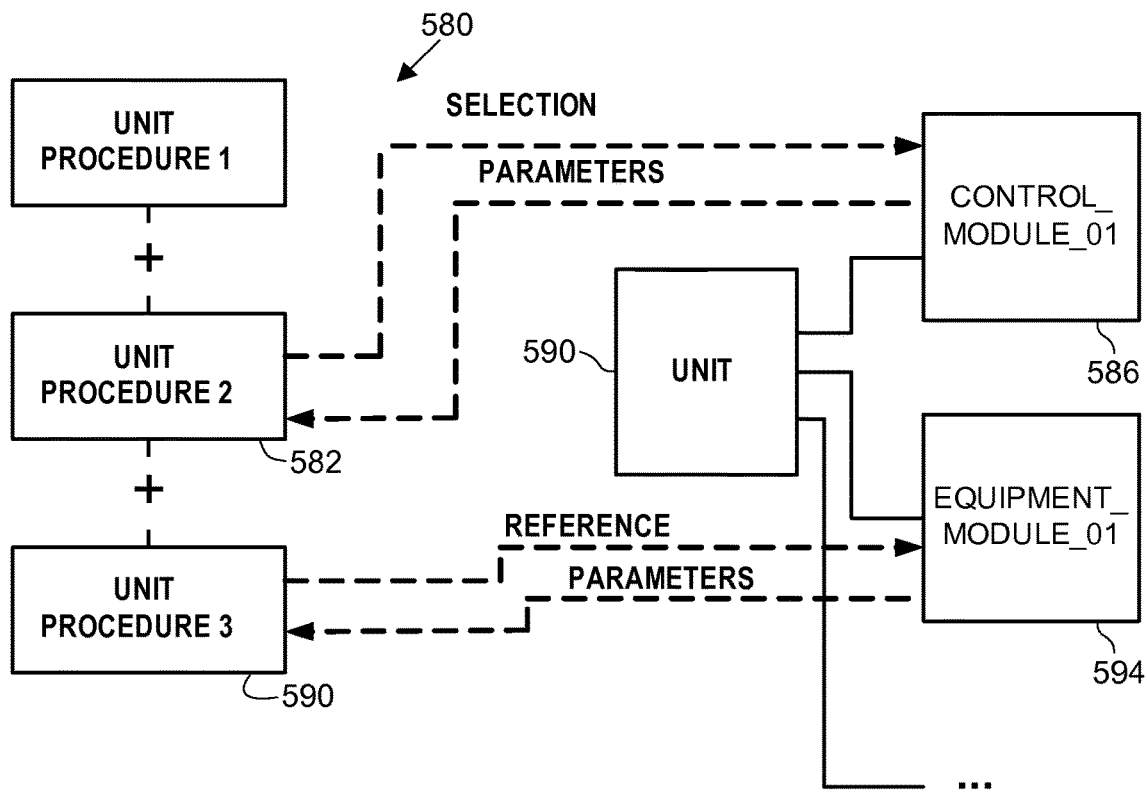
FIG. 11 is a block diagram illustrating a dynamic selection of a value specific to a selected control module of a unit of manufacturing equipment.
Figure 12:
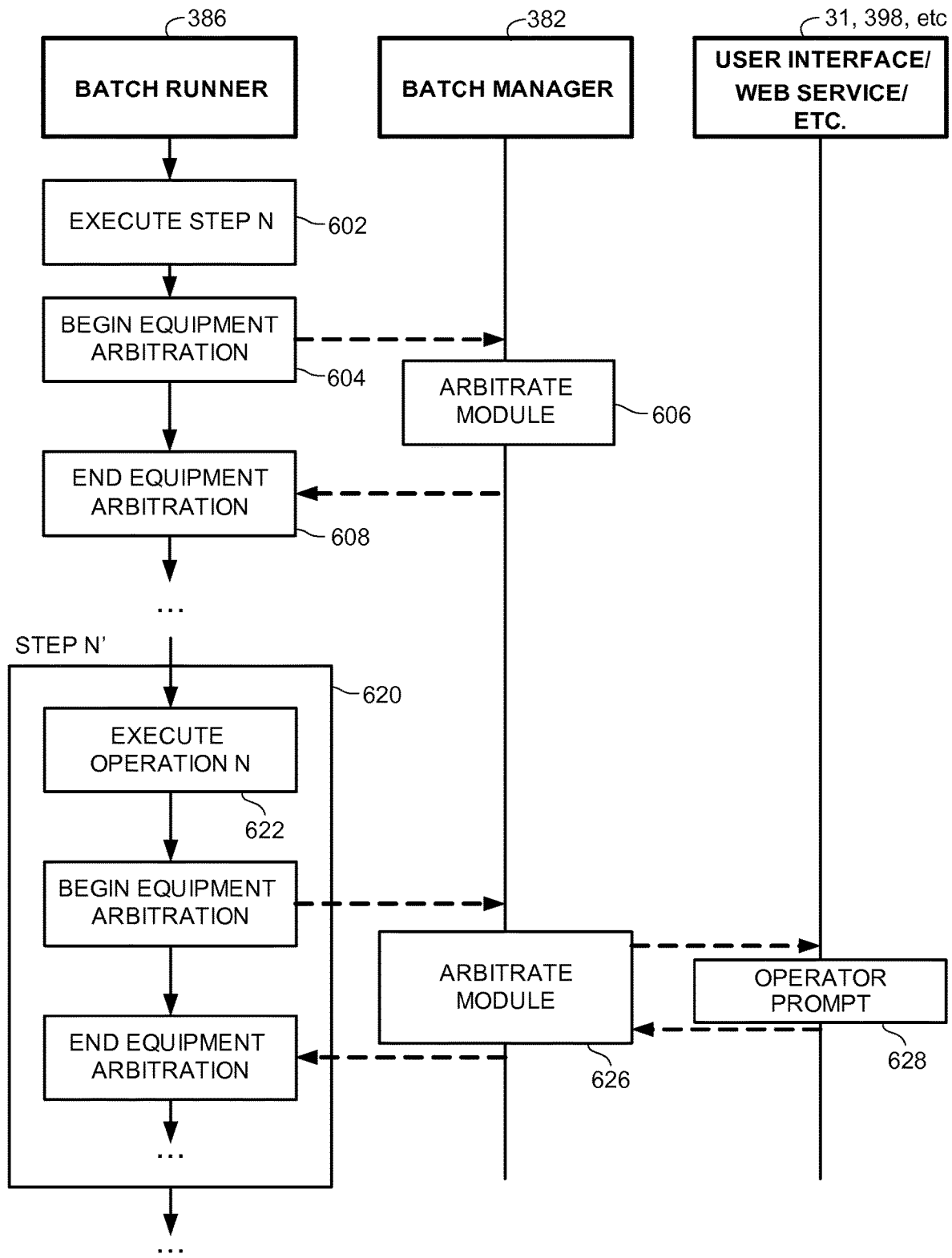
FIG. 12 is a message sequence chart illustrating equipment arbitration on various levels of recipe hierarchy.
Figure 13:
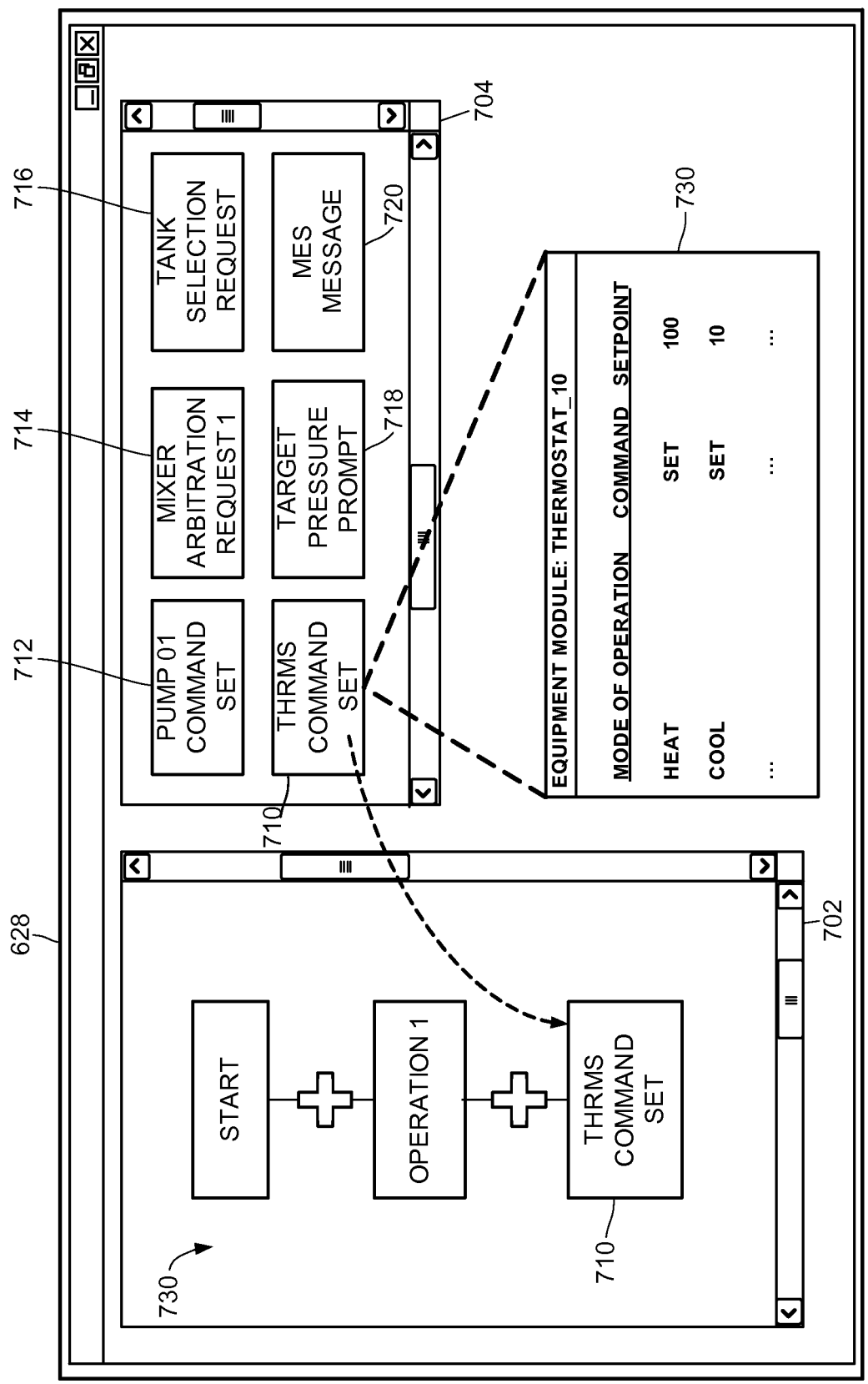
FIG. 13 is an example interface screen that the batch execution environment of the present disclosure may present to a user for selecting a predefined command set, an equipment arbitration request, a unit selection request, an operator prompt, or a message for a Manufacturing Execution System (MES) and adding the selection to recipe logic on a certain selected level.

As briefly indicated above, the process control system 10 and, more specifically, the batch executive 30 supports dynamic input parameters and predefined command steps on various levels of recipe logic so that a user can create product recipes having more flexibility as well as improved adaptability to changes in the process plant 16. FIG. 7 illustrates one such dynamic parameter function and FIGS. 8 and 9 illustrate a user interface which the BOI 32 may provide to facilitate the use of this functionality. FIGS. 10 and 11 illustrate two other scenarios related to the dynamic input parameter function of the present disclosure, FIG. 12 illustrates equipment arbitration and equipment selection on several levels of recipe logic according to the method and system of the present disclosure, and FIG. 13 illustrates one example of a user interface that the BOI 32 may support to allow users to efficiently add predefined commands, arbitration requests, etc. to a recipe.

Referring to FIG. 7, a certain recipe may include an operation 400 (encapsulated in a unit procedure or linked directly to high-level recipe logic) that includes phases 402-408. Upon completing the phase 402, the operation 400 may transition to the phase 404 and supply batch input parameters 410 to the corresponding equipment phase 412. For example, the phase 404 may specify a temperature to which the material processed in the equipment phase 412 should be heated, or the number minutes a mixer in the equipment phases 412 should operate upon the mix of ingredients prepared during the previous phase 402. Next, the equipment phase 412 may report a single output or report parameter 414 or multiple output or report parameters 414 during runtime or upon completion of the equipment phase 412. To continue with the examples above, the output parameter may be an average of temperature measurements collected during the execution of the equipment phase 412 or the number of gallons produced by the mixer in the equipment phase 412.

In addition to (or, in some cases, instead of) propagating the received output parameter 414 to the data historian 19, the user interface 32, or another module for the purposes of logging, the operation 400 may associate the output parameter 414 with an input parameter to another equipment phase such as the equipment phase 416, for example FIG. 7 schematically illustrates the association of the output parameter 414 with an input parameter to another phase through a path 418 by way of the operation 400. In other words, the operation 400 may "refer" an input parameter to an output parameter at the level of operational logic, thereby allowing a dynamic control of a phase in view of one or several preceding or parallel phases.

FIG. 8 illustrates an example interface screen 440 which a user may access via the user interface 32 to configure dynamic input parameters and, in particular, to associate an output or report parameter of a phase with an input parameter of another phase, as discussed above in reference to FIG. 7. The interface screen 440 may include a recipe level selection pane 442, a recipe logic configuration pane 444, and a parameter configuration pane 446. The user may select a recipe, a unit procedure, an operation, or a phase in the recipe level selection pane 442 and, by double-clicking on the selected module or activating a similar control, load the logic of the module in the recipe logic configuration pane 444 for viewing and editing. Similarly, the user may highlight a parameter in the parameter configuration pane 446 and select the highlighted parameter by activating the button 450, for example.

As illustrated in FIG. 8, the user may select the phase 460 in the pane 444 and the parameter configuration pane 446 may accordingly display several input and parameters associated with the selected phase 460. In this example, the phase 460 receives two input parameters 470 and 472 and outputs or reports two output parameters 480 and 482. To associate the output parameter 480, for example, with an input parameter to another phase and enable the configuration illustrated in FIG. 7, the user may accordingly configure the output parameter 480 via the interface screen 440 and/or one or several derivate screens. In particular, the user may activate a parameter configuration menu 500 illustrated in FIG. 9 by highlighting the output parameters 480 and activating the select button 450.

Now referring to FIG. 9, the interface screen 500 is dedicated to configuring parameter properties and may include a parameter name identifier field 502, a category list selector 504, a destination list selector 506, a target list selector 508, etc. One of ordinary skill in the art will appreciate that the interface screen 500 could also include additional information fields, input fields, and list-selectable options or, conversely, may include fewer fields and selectors than illustrated in FIG. 9. In this example, the interface screen 500 allows the user to direct the selected parameter, PH_OUTPUT_PAR1 or output parameter 480 discussed above with reference to FIG. 8, to a target operation-level parameter OP_PARAM1 which the user may locate in the target list selector 508. In some embodiments, the user may define a new target parameter if the desired parameter is not available in the target list selector 508. In this case, the interface screen 500 may trigger one or several user dialogues for defining and configuring the target parameter.

The destination list selector 506 may include such selections as "defer" parameter or "refer" parameter, for example. In the example of FIG. 9, the user selects the "refer" option to map the target OP_PARAM_1 to the output parameter 480 or, in other words, to automatically supply the value of the output parameter 480 to the OP_PARAM_1 parameter. Upon completing these configuration steps, the user may accept the changes by activating the control 510 or canceling the changes via the control 512.

Next, the user may wish to associate the OP_PARAM_1 parameter with an input parameter of another phase, for example. To this end, the user may select another phase and trigger another interface screen (not shown). This interface screen would allow the user to select the OP_PARAM_1 and configure a reverse association of the operation-level OP_PARAM_1 parameter and a phase input parameter. In other words, the user may operate one or several interactive screens, similar to the screens 440 and 500, to "defer" a phase input parameter to the operation-level parameter OP_PARAM_1.

In some embodiments, the user could also propagate the value of PH_OUTPUT_PAR1 further up the recipe hierarchy to be processed on the level of an operation or unit procedure, for example, rather than on a phase level. Thus, it will be appreciated that the scenario discussed in reference to FIGS. 7-9 is provided by way of example only and that similar parameter passing on other levels of recipe logic are also contemplated.

FIG. 10 illustrates a fragment of a recipe that uses another type of a dynamic input parameter. Specifically, a recipe 530 may include a unit procedure 532 that includes a dynamic parameter with a reference path which resolves to a numerical value only during runtime upon selection of a certain unit and a certain parameter associated with the unit. The user may include a parameter SELECTED_UNIT/CAPACITY in the unit procedure 532 so that a batch runner 386-390, for example (see FIG. 6) selects an appropriate unit from among the candidate set 550 and resolves the SELECTED_UNIT/CAPACITY to a specific value. In the example illustrated in FIG. 10, the batch runner selects the unit 552 (associated with the identifier "UNIT_02") and retrieves the CAPACITY parameter 560 from the parameter set 562. To continue with the example above, the CAPACITY of the unit 552 may correspond to the physical capacity of a primary mixing tank included in the unit 552 and may be, for example, 1000 gallons. To retrieve the value "1000" of the parameter 560, the unit procedure 532 may include phase-level logic that causes the unit 552 to report the value of the parameter 560 via an output parameter.

Alternatively, some or all of the parameter set 562 may be stored elsewhere in the process plant 16 or the process control system 10. For example, the database 34 may maintain unit and equipment module parameters, and the batch runner 386-390 may retrieve the necessary parameter from the database 34 upon selecting the unit 552. In either case, however, the dynamic parameter SELECTED_UNIT/CAPACITY may resolve to a specific value (e.g., a numerical value, a character string, etc.) that resides outside the recipe 530.

In other situations, the unit procedure 532 could specify the complete path to the parameter 560 if the unit 552 is selected at the time of creation of the recipe 530, for example. In one such case, the user may include a parameter UNIT_02/CAPACITY in the unit procedure 532. The dynamic parameter UNIT_02/CAPACITY may similarly resolve to a specific value when the corresponding batch runner 386-390 loads the phase-level logic to the unit 552. As in the example discussed above, the specific value of the parameter may be unknown or otherwise unavailable at the time of creation of the recipe 530, and the value to which UNIT_02/CAPACITY resolves during runtime is outside the recipe 530.

Referring to FIG. 11, a recipe 580 may include a unit procedure 582 that references a parameter associated with a control module 586 selected during runtime, and a unit procedure 590 that directly references a parameter associated with an equipment module 594. In this particular example, the control module 586 and the equipment module 594 belong to the same unit 596. However, it is also possible for recipes, unit procedures, operations, and phases to reference values in unrelated control modules, equipment modules, units, etc.

Similarly to the example illustrated in FIG. 10, the unit procedure 582 may include a parameter SELECTED_CONTROL_MODULE/MAX_SPEED, for example, which may resolve to CONTROL_MODULE_01/MAX_SPEED during execution and, ultimately, to a specific value corresponding to the maximum speed of a motor associated with the control module 586, for example. The unit procedure 590 may include a parameter EQUIPMENT_MODULE_01/WEIGHT, for example.

Generally with respect to FIGS. 10 and 11, it is noted that a recipe may refer to unit or equipment module parameters on any level of the recipe. Thus, a recipe may include dynamic input parameters at transition from one step to another, within unit procedures, within operations, or within phases. Further, it will be noted that dynamic input parameters may refer to static values (e.g., capacity of a tank) or changing values (e.g., current temperature within a mixing tank).

Figure 14:
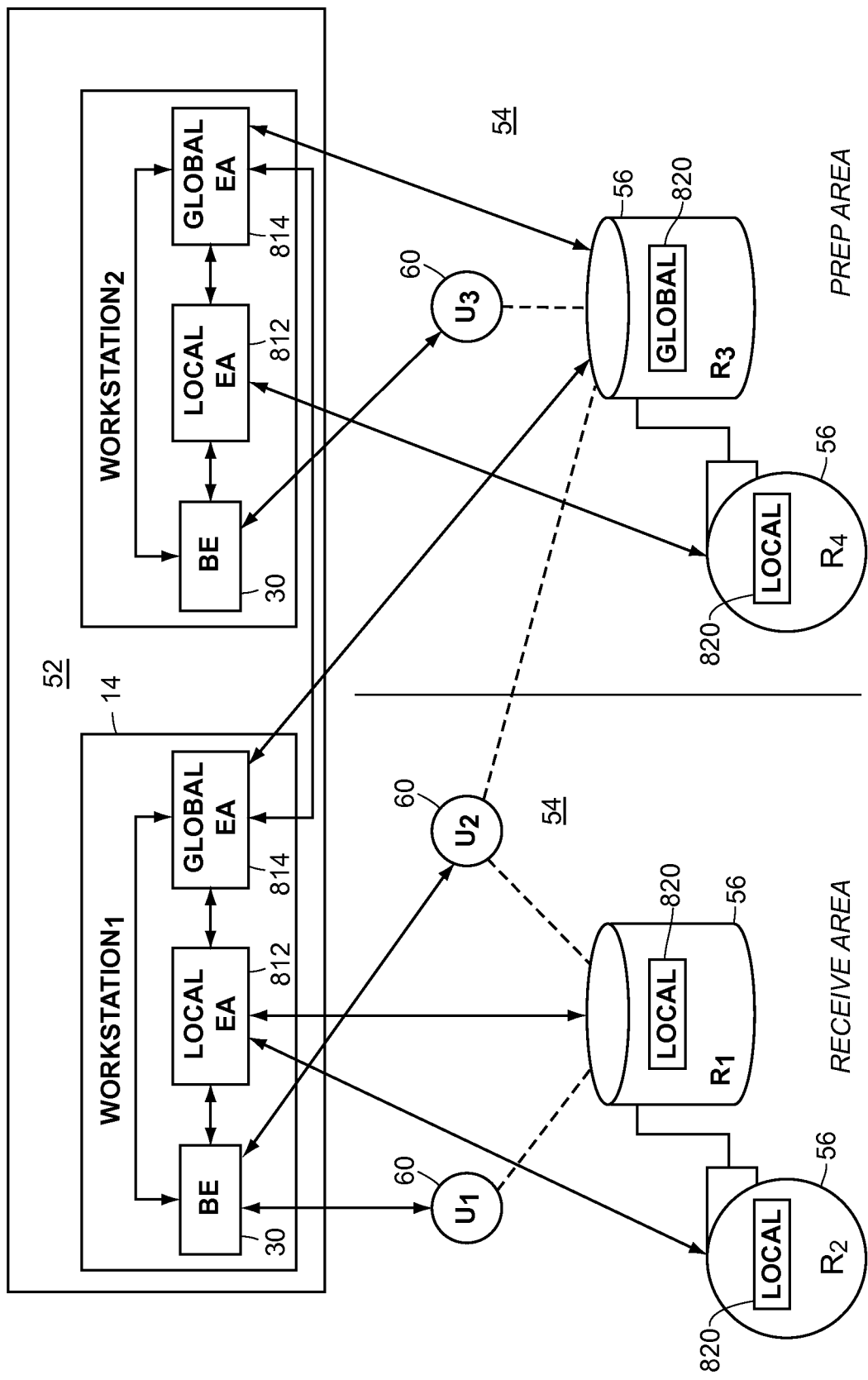
FIG. 14 is a schematic diagram illustrating a process control network in which a batch execution environment consistent with one embodiment of the present disclosure may arbitrate access to manufacturing equipment.

Next, the use of predefined command steps will be discussed both generally and with specific reference to several examples of equipment arbitration and equipment selection illustrated in FIGS. 12 and 13. FIG. 14 further provides one example of an equipment arbitration system that may be used in the process control 12 and the process plant 16. As indicated above, the batch executive 30 (see, e.g., FIGS. 1 and 6) allows a user to define sets of commands, setpoints, command parameters, and other relevant information, associate these predefined sets of commands with certain equipment or control modules, and efficiently design recipes by adding a desired predefined set of commands to any level of recipe hierarchy. When used in a recipe, these commands sets may perform equipment arbitration and/or selection, provide operator prompts and messages, send messages to external systems, send commands and data to equipment modules according to a selected mode of operations, and perform other predefined functionality. In one embodiment, each predefined set may acquire an easily recognizable visual indicator such as an icon, for example, and may be available in a certain pane for selection with any pointing device such as a mouse. The operator may then select the desired predefined set of commands by clicking on the corresponding icon, drag the icon to a canvass area used for recipe creation or editing, and drop the icon in the desired location within the recipe logic.

To take just one specific example of using a predefined command set to simplify the configuration of an equipment module, a certain thermostat may operate in a "hot" or "cold" mode, each having a respective setpoint. Because the batch executive 30 may support multiple concurrent batches executing according to different recipes, the thermostat potentially may be used in many different batches and recipes. Thus, the user may create a new command set using the BOI 32, optionally assign a name or identifier to the command set such as THERMOSTAT_MACRO, for example, define several steps for each mode of operation (i.e., "hot" and "cold"), and specify the parameters and/or one or more setpoints for each mode of operation. The user may then save the newly created command set and may optionally assign a custom icon to the command set for easy visual recognition. At this time, the user may specify a storage location for the command set THERMOSTAT_MACRO which may be, for example, the configuration database 34.

When creating or editing recipes, the user may select the icon for THERMOSTAT_MACRO or refer to this predefined command set by name or other identifier and add THERMOSTAT_MACRO to the recipe. The user may then select the desired mode of operation according to the particular recipe, and may optionally adjust one or several parameters of THERMOSTAT_MACRO. In either case, the user need not perform detailed configuration or programming of the thermostat module on the phase level. Further, the BOI 32 may automatically determine the level of recipe logic (e.g., unit procedure, operation, etc.) to which the user wishes to add THERMOSTAT_MACRO and connect THERMOSTAT_MACRO to the recipe logic using transitions appropriate for the selected level and accordance with any other rules specific to this level.

With respect to equipment arbitration and selection, FIG. 12 illustrates the batch runner 386 dynamically interacting with the user interface 31, a web service 398, or some external module via the batch manager 382. In block 602, the batch runner 386 may execute a certain step of a recipe. Next, in block 604, the batch runner 386 may encounter a predefined command set in the recipe that requires equipment arbitration. Notably, the block 604 in this example corresponds to the procedural, or highest level of recipe logic. Thus, to initiate equipment arbitration, the batch runner 386 need not arrive at a certain phase within a certain operation of the recipe but may instead request arbitration at any level of recipe logic. It will be also noted that the batch runner 386 may request arbitration of a unit having several equipment or control modules, if desired. In other cases, the batch runner 386 may request arbitration of a specific equipment module or a control module.

The batch manager may conduct arbitration in block 606 using any suitable arbitration method, including the techniques explained in detail below with reference to FIG. 14. In this particular case, the batch manager 606 may resolve the arbitration request automatically. Next, in block 608, the batch runner 386 may receive a response specifying the results of equipment arbitration from the batch manager 382, and continue execution of the recipe.

Further, the recipe which the batch runner 386 executes may include another equipment arbitration request. In the example illustrated in FIG. 12, the user has associated the second equipment arbitration request with a step 620, to be initiated upon completion of the operation 622. The batch manager 382 may process the second arbitration request in block 626 that may in turn trigger an operator prompt 628. It will be noted that the second arbitration request may be the same predefined command step as the first arbitration request initiated in block 604. In particular, the user may have used the same predefined command set in two locations in the recipe, each corresponding to a different level of recipe logic. As explained above, the BOI 32 may automatically adjust the command set to properly fit into the recipe at the selected level of logic and thereby greatly simplify the user's configuration effort.

Now referring to FIG. 13, an interface screen 700 may include a recipe editing pane 702 and a predefined command set selection pane 704. In this example, the predefined command set selection pane 704 may include a control module command set 710 for a certain thermostat, an equipment module command set 712 for use with a certain pump, an arbitration request command set 714 for use with a certain mixer, a unit selection command set 716 for use with a certain storage tank, an operator prompt command set 718 to query for a target pressure, and a Manufacturing Execution System message command set 720 to send a status update to the MES.

The user may select any of the predefined command sets 710-720 and drag-and-drop the selected command set to the canvass area of the pane 702. One example of adding an instance of the control module command set 710 to a recipe 730 is illustrated in FIG. 13. Additionally, an exploded view 730 of the control module command set 710 illustrates that the corresponding equipment module has at least two mode of operations, each associated with a separate setpoint. As discussed above, the user may select the desired mode of operation and, optionally, adjust the parameters upon adding the control module command set 710 to the recipe 702. Of course, the user may also "drill" down to operation-level or phase-level logic to add the control module command set 710 to any level of the recipe 702. The user may similarly drag-and-drop any of the predefined steps 710-720 to a desired location in the logic of the recipe 702, adjust one or several parameters, etc.

FIG. 14 illustrates one example embodiment of an equipment arbitration system which the batch executive 30 may utilize to efficiently resolve equipment access and scheduling conflicts. As discussed above, the process control system 10 includes one or more workstations 14 and the resources 56 further comprise a type 820. A respective type 820 is associated with each resource 56 and indicates whether the resource 56 is used only in a single area 54, or across multiple areas 54. In one embodiment, the type 820 is either "local" or "global". The local type 820 indicates that the resource 56 is used in only one area 54, while the global type 820 indicates that the resource 56 is used across multiple areas 54. By designating whether a resource 56 is needed in only one area 54 or across multiple areas 54, multi-area equipment arbitrators can manage simultaneous or competing requests for the same resource 56 from users 60 across multiple areas 54 without having to manage all resources 56. In one embodiment, the determination of whether a particular resource 56 is local or global is performed by a human operator or engineer associated with the process plant 16.

The workstations 14 may comprise hardware and/or software, such as monitors, keyboards, central processing units (CPUs), computer readable memory and storage, operable to provide process control services. For example, the workstations 100 may be computer workstations or personal computers (PCs) running the Microsoft® Windows NT, 2000 or XP® operating systems on Intel® Corp. computer processors. For another example, the workstations 100 may include electronic memory, such as random access memory (RAM), dynamic RAM (DRAM) and read-only memory (ROM), magnetic and optical storage, such as hard drives, floppy disk drives, CD-ROM drives, CD-RW drives and digital versatile disk (DVD) drives, and other suitable computer components.

The workstations 14 may further comprise hatch process control capabilities, such as the DeltaV™ Batch software sold by Emerson Process Management as part of the DeltaV™ system. In one embodiment, the workstations 100 further comprise the batch executive 30, a local equipment arbitrator (LAR) 812, and a global equipment arbitrator (GAR) 814.

The batch executive 30 comprises software stored on a computer readable medium and operable to perform the batch processing portion of the process control system 52 for one or more areas 54. In one embodiment, each respective area 54 is controlled by a separate hatch executive 30. The batch executive 30 controls the resources 56 and resource users 60 that perform the steps of the recipes used at the plant 50. For example, the batch executive 30 may control a heater resource to heat a substance for 15 minutes at 350 degrees F. and then decant the heated substance into a mixer resource. The batch executive 30 may be controlling the performance of multiple recipes substantially simultaneously and/or in parallel with each other. The batch executive 30 communicates with the LAR 812 and GAR 814 to handle requests for resources 56 by users 60.

The LAR 812 comprises software stored on a computer readable medium and/or hardware operable to communicate with the batch executive 30 to arbitrate conflicting requests for use of resources 56 by users 60 within a particular area 54. More specifically, as the batch executive 30 is performing recipes using resources 56, two or more users 60 may require the use of the same resource 56 at substantially the same time. If the batch executive 30 allows both users 60 to use the same resource 56 at substantially the same time, both recipes may be ruined. Similarly, as part of a recipe, the batch executive 30 may determine that one or more resources 56 may need to be reserved in the future for time sensitive steps in a recipe, or that a particular resource 56 must be prepared prior to use in a particular recipe, such as a resource 56 that requires cleaning. Prior to allocating or reserving one or more resources 56 to a user 60, the batch executive 30 requests use of the resource 56 from the LAR 812. LAR 812 determines whether the requested resource 56 is available for use by the hatch executive 30 within the batch executive's particular area 54. In one embodiment, LAR 812 only handles resources 56 with a type 820 of "local".

GAR 814 comprises software stored on a computer readable medium and/or hardware operable to communicate with the batch executive 30 to arbitrate conflicting requests for use of resources 56 by users 60 across two or more areas 54. More specifically, as the batch executive 30 is performing recipes using resources 56, two or more recipes may require the use of the same resource 56 at substantially the same time. Prior to allocating or reserving one or more resources 56 to a recipe, the batch executive 30 may request use of the resources 56 in different areas 54 from the GAR 814. The GAR 814 determines whether the requested resource 56 is available for use by the batch executive 30 outside of the hatch executive's particular area 54. In one embodiment, the GAR 814 only handles resources 56 with a type 820 of "global". The GARs 814 are capable of communicating with each other in order to resolve requests for resources 56.

In one embodiment, a respective GAR 814 is associated with each respective batch executive 30 and is responsible for the resources 56 with a type 820 of global in that batch executive's particular area 54. A second GAR 814 in a different area 54 requests the resource 56 from the GAR 814 associated with the area 54 having the requested resource 56. For example, referring to FIG. 14, user U2 may request access to resource R3. Since the user U2 is in a different area from the resource R3, the GAR 814 in the user U2's area will request access to the resource R3 from the GAR 814 in the resource R3's area.

Also, in one embodiment, the GARs 814 may be operable to handle failure of another GAR 814 by taking over resources 56 handled by the failed GAR 814. For example, the GAR 814 in a first area may fail and the GAR 814 in a second area may take over resource arbitration for the resources 56 in the failed GAR's area.

In operation, one or more batch executives 30 control the performance of one or more recipes in each of one or more areas 54. Various resource users 60 may request access to one or more resources 56 in order to perform steps of the recipes. The resource users 60 request access to the resources 56 through the batch executive 30. The batch executive then passes the requests for resources 56 to the LAR 812 or GAR 814 associated with the batch executive based on the type 820 of the resource 56 being requested.

When the type 820 of the requested resource 56 is local, the LAR 812 determines whether the resource 56 is available for use by the user 60 based on suitable criteria. For example, the LAR 812 may simply determine whether the resource 56 is currently being used by another user 60. The LAR 812 may also perform complex usage determinations, such as whether resource 56 needs to be cleaned, such as by clean-in-place systems, prior to being used by user 60 or that resource 56 needs to be at a certain temperature prior to being used by the requesting user 60. The LAR 812 then communicates whether, and optionally when, the requested resource 56 is available to batch executive 30. For example, if users U1 and U2 attempt to access resource R1, then the LAR 812 will decide which user gets access to the requested resource.

When the type 820 of the requested resource 56 is global, the GAR 814 determines whether the resource 56 is available for use by the requesting user 60. If the requested resource 56 is in the same area as the GAR 814 associated with the batch executive 30, the GAR 814 determines whether the resource is available and communicates whether the requested resource is available to the batch executive 30. If the requested resource 56 is in a different area from the GAR 814 associated with the batch executive 30, the GAR. 814 communicates the request to the GAR 814 having the requested resource 56 in its area 54. The requesting GAR 814 may determine the appropriate GAR 814 to handle the request using any suitable method. In one embodiment, the GARs 814 are organized as peers in a peer-to-peer network configuration where requests are broadcast to all or a portion of the GARs 814 and is handled by the appropriate GAR 814. In another embodiment, the GARs 814 may again be organized as peers, but exchange lists of handled resources 56 and avoid the need to broadcast the request to all GARs 814. Instead, the appropriate GAR 814 could be contacted directly by the requesting GAR 814. In general, the GARs 814 may be organized in any suitable manner. The appropriate GAR 814 determines whether the requested resource 56 is available and communicates the result back to the requesting GAR 814. The requesting GAR 814 then passes the result back to the batch executive 30 for handling. Alternatively, the requesting GAR 814 may be bypassed and the result sent directly back to the requesting batch executive 30. For example, referring to FIG. 14, if user U3 is currently using resource R3 and user U2 wishes to access resource R3, the GAR 814 in U2's area will pass U2's request to the GAR 814 in R3's area for handling.

The batch executive 30 then handles whether the requested resource 56 is available. For unavailable resources, batch executive 30 may take suitable action, such as pausing the execution of the recipe associated with the requesting user 60.

In one embodiment, the GARs 814 may select a master GAR from all or a portion of the GARs 814 provided by the process control system 52. Any suitable GAR 814 may act as the master GAR. For example, the master GAR may be restricted to GARs 814 running on workstations 100 that have a certain amount of processing power or less than a certain amount of processing load. The master GAR may act as a centralized database for tracking whether particular resources 56 are available, what resources 56 are in what areas 54 and/or provide other suitable data. A master GAR may be used to decrease the amount of communication needed between GARs 814 by storing the mapping between resources 56 and the GAR 814 assigned to handle that resource 56. In another embodiment, the master GAR may store status information, such as availability, for resources 56. In this embodiment, the requesting GAR 814 could query the master GAR to determine whether a resource 56 is available. The selection of the master GAR may be performed using any suitable techniques. For example, the GARs 814 may elect a master GAR by determining which GAR 814 was first activated. Other techniques for electing or selecting "master" elements in a network are well known in the art.

The GARs 814 may also be capable of handling the failure of other GARs 814. More specifically, the GAR 814 in a particular area 54 may fail, such as by crashing. Another GAR 814 may detect such a failure and take over handling of the failed GAR's resources 56. For example, the master GAR may detect a failure and assign another GAR 814 to the failed GAR's resources 56. In another example, a requesting GAR 814 may detect that another GAR 814 has failed to respond for some period of time and take over the resources 56 handled by the failed GAR 814.

In another embodiment, the GARs 814 may collectively determine whether a user 60 may use a particular resource 56. For example, in contrast to having the GAR 814 in each area 54 be responsible for handling access to resources 56 in that area 54, two or more GARs 814 may be responsible for handling access to one or more resources 56 in one or more areas 54. In general, some or all of the GARs 814 may be responsible for handling access to some or all of the resources 56 in the areas 54 as suitable. For example, further types 820 may be defined to determine how availability of a particular resource 56 is handled by the GARs 814. Collective determination of the availability of resources 56 may be based on voting by the GARs 814 or by other suitable techniques. Also, collective determination may allow particular GARs 814 to have priority in determining the availability of particular resources 56. For example, a first GAR may get more votes than, or a veto power over, one or more second GARs. Further, the increased voting power or veto ability of one or more GARs 814 may be based on the particular resources 56 being requested. Giving a GAR 814 increased voting power or a veto power may provide the ability to allow priority use of resources 56 in particular situations. For example, an emergency or an unexpected result may require priority access be given to certain users 60.

From the foregoing, it will be appreciated that the method and system for including dynamic input parameters and/or predefined command steps in a product recipe allows a user to reference values outside the logic of the product recipe, adjust batch operation during runtime by referencing values generated by previous or parallel equipment phases or external modules (e.g., a LIMS, a web service, etc.), and reduce operators' effort by automatically retrieving results of phase execution and supplying these results to another phase, operation, or unit procedure. Moreover, the methods and system discussed above allow users to perform equipment arbitration and selection at any level of recipe logic and thereby avoid "pushing" all of the equipment-related logic down to the phase level of the corresponding recipe. Moreover, the support of predefined command steps described above allows operators and engineers to efficiently define recipes in an environment where multiple batches execute according to multiple recipes and frequently attempt to secure common physical resources. In particular, predefined command steps allow users to associate a simple or, if desired, a relatively complex set of instructions, parameters, and/or setpoints with a certain class of equipment (e.g., unit class) or a particular instance of equipment and add this predefined set of commands to multiple recipes with either no adjustments at all, or with simple selections of a desired mode of operation and/or target values, for example.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A non-transitory computer-readable medium storing instructions for generating a product recipe for execution by a batch process in an automated manufacturing environment, wherein the product recipe is associated with a plurality of actions, a set of transitions, and a set of parameters, wherein the plurality of actions define a plurality of logical levels including a phase level at which the batch process interacts with equipment, and wherein the instructions, when executed by one or more processors of a computer system, cause the one or more processors to:
receive a procedure definition specifying the plurality of actions;
receive a transaction definition specifying the set of transitions, wherein each one in the set of transitions is associated with two or more of the plurality of actions;
receive the set of parameters, including
at least one dynamic input parameter including an unresolved value, wherein the unresolved value of the dynamic input parameter automatically resolves to a value during execution of the product recipe of the batch process without obtaining the value from the product recipe or an operator prompt associated at the phase level of the product recipe, and,
generate the product recipe to include the received dynamic input parameter, the received procedure definition, the received transaction definition, and the received set of parameters, wherein the dynamic input parameter automatically resolves to a value at a transition from one step of the recipe to another step of the recipe, or during the execution of a step, an operation, or a phase of the executing batch process.

2. The non-transitory computer-readable medium of claim 1, wherein the instructions cause one or more processors to receive the at least one dynamic input parameter by at least receiving the at least one dynamic input parameter that corresponds to a value supplied to the batch process by an external entity during the execution of the batch process.

3. The non-transitory computer-readable medium of claim 2, wherein the instructions cause one or more processors to receive the at least one dynamic input parameter by at least receiving the at least one dynamic input parameter that corresponds to a value supplied to the batch process by a web service.

4. The non-transitory computer-readable medium of claim 2, wherein the instructions cause one or more processors to receive the at least one dynamic input parameter by at least receiving the at least one dynamic input parameter that corresponds to a value supplied to the batch process by a Laboratory Information Management System (LIMS).

5. The non-transitory computer-readable medium of claim 2, wherein the instructions cause one or more processors to receive the at least one dynamic input parameter by at least receiving the at least one dynamic input parameter that corresponds to a value supplied to the batch process from an operator prompt associated with one of the plurality of logical levels of the recipe above the phase level.

6. The non-transitory computer-readable medium of claim 1, wherein the instructions cause one or more processors to receive the at least one dynamic input parameter by at least receiving the at least one dynamic input parameter that corresponds to a value of a reporting parameter generated during the execution of the batch process.

7. The non-transitory computer-readable medium of claim 6, wherein the reporting parameter is associated with the phase level of the recipe.

8. The non-transitory computer-readable medium of claim 1, further comprising additional instructions, that when executed by the one or more processors of the computer system, cause the one or more processors to:
receive a selection of a reporting parameter associated with one of the plurality of actions; and
associate the selected reporting parameter with an input parameter to the recipe.

9. The non-transitory computer-readable medium of claim 8, further comprising an additional instruction, that when executed by the one or more processors of the computer system, causes the one or more processors to:
receive a mapping of the selected reporting parameter to an input parameter of another one of the plurality of actions.

10. The non-transitory computer-readable medium of claim 1, wherein the instructions cause one or more processors to receive the at least one dynamic input parameter by at least receiving the at least one dynamic input parameter that corresponds to a value associated with a parameter of an equipment entity.

11. The non-transitory computer-readable medium of claim 10, wherein the equipment entity is selected by the batch process during runtime.

12. The non-transitory computer-readable medium of claim 1, wherein the instructions cause one or more processors to receive the at least one dynamic input parameter by at least receiving a path specifying an equipment entity, and receiving a parameter identifier specifying a parameter of the equipment entity.

13. The non-transitory computer-readable medium of claim 12, wherein the instructions cause one or more processors to receive the path specifying the equipment entity by at least receiving a reference to one of an equipment module or a control module dynamically selected during the execution of the batch process.

14. The non-transitory computer-readable medium of claim 12 wherein the instructions cause one or more processors to receive the path specifying the equipment entity by at least receiving a specific reference to one of an equipment module or a control module.

15. A software component stored as a set of instructions on a non-transitory computer-readable medium and to be executed by one or more processors for generating a product recipe to control execution of a batch process in a manufacturing environment, the product recipe including at least one dynamic input parameter including an unresolved value such that the dynamic input parameter allows the batch process to adjust to changing operating conditions during runtime, the product recipe being associated with a plurality of actions, a set of transitions, and a set of parameters, wherein the plurality of actions define a plurality of logical levels including a phase level at which the batch process interacts with equipment, the software component comprising:
a product recipe definition module to receive a definition of the product recipe, including:

a first function to receive a first data set specifying a plurality of actions, the first data set being a procedure definition;
a second function to receive a second data set specifying at least one transition between at least two of the plurality of actions, the second data set being a transition definition;
a third function to receive a third data set specifying a plurality of parameters of the product recipe including at least one dynamic parameter that includes an unresolved value, wherein the unresolved value of the dynamic parameter automatically resolves to a value during execution of the batch process without obtaining the value from the product recipe or an operator prompt associated at the phase level of the product recipe; and
a fourth function to generate the product recipe to include the received dynamic input parameter, the received first data set, the received second data set, and the received third data set, wherein the dynamic input parameter automatically resolves to a value at a transition from one step of the recipe to another step of the recipe, or during the execution of a step, an operation, or a phase of the executing batch process.

16. The software component of claim 15, wherein at least two of the plurality of actions are phases, each specifying an equipment level logic, and wherein the product recipe definition module further includes:
a fifth function to display a listing of output parameters associated with a first one of the at least two phases; and
a sixth function to receive a mapping of one of the output parameters to an input parameter associated with another one of the plurality of actions.

17. The software component of claim 16, further comprising:
a seventh function to display a listing of input parameters associated with a second one of the at least two phases and to receive a selection of one of the input parameters; and
an eighth function to associate the input parameter received in the sixth function with the one of the input parameters selected in the seventh function.

18. The software component of claim 15, wherein the at least one dynamic parameter corresponds to an external parameter, and wherein the at least one dynamic parameter includes:
a path to specify an entity associated with the external parameter; and
a parameter identifier to specify the external parameter associated with the entity.

19. The software component of claim 18, wherein the entity is one of an equipment module or a control module selected during the execution of the batch process, and wherein the path specifies a currently selected module using a predefined operand.

20. The software component of claim 18, wherein the path specifies one of an equipment module or a control module selected prior to the execution of the batch process using a unique identifier of the one of an equipment module or a control module.

21. The software component of claim 15, wherein the plurality of actions includes a first phase and a second phase associated with the lowest level of logic of the product recipe, and wherein the at least one dynamic parameter is an input parameter to the first phase mapped to an output parameter of the second phase.

22. The software component of claim 15, wherein the at least one dynamic parameter corresponds to a report value generated during the execution of the batch process, the software component further comprising:
a value mapping module, including:
a first function to obtain the report value;
a second function to assign the obtained report value to the at least one dynamic parameter; and
a third function to download the at least one dynamic parameter to a process controller responsible for executing the one of the plurality of actions to which the at least one dynamic parameter corresponds.

23. A data structure stored on a computer-readable medium for defining a product recipe for automatically manufacturing a product in a batch execution environment, the product recipe including at least one dynamic input parameter including an unresolved value such that the dynamic input parameter allows the batch process to adjust to changing operating conditions during runtime, the data structure comprising:
first data defining a plurality of actions separated by respective transitions;
second data specifying one or more types of manufacturing equipment to execute the plurality of actions;
third data defining a set of parameters including a dynamic input parameter within the product recipe, wherein the dynamic input parameter includes an unresolved value at a time of initiating a batch run, and wherein the unresolved value of the dynamic input parameter automatically resolves to a value during execution of the product recipe of a batch process without obtaining the value from the product recipe or an operator prompt associated at the phase level of the product recipe; and
a fourth data to generate the product recipe to include the dynamic input parameter, the first data and the second data, wherein the dynamic input parameter automatically resolves to a value at a transition from one step of the recipe to another step of the recipe, or during the execution of a step, an operation, or a phase of the executing batch process.

24. The data structure of claim 23, wherein the dynamic input parameter corresponds to one of a report parameter of a phase of the product recipe, a parameter associated with an equipment module or a control module, or a parameter received from an external system during the execution of the product recipe.

25. The data structure of claim 23, wherein the dynamic input parameter is an input parameter of a first phase that acquires a value corresponding to an output parameter of a second phase during the execution of the product recipe by a batch process.

26. A system executing a product recipe of a batch process in a manufacturing environment, the system comprising:
a processor;
a user interface coupled to the processor; and
a memory device coupled to the processor and including instructions stored thereon, which when executed by the processor, cause the system to:
receive a procedure definition specifying a plurality of actions defining a plurality of logic levels including a phase level at which the batch process interacts with equipment;
receive a transaction definition specifying a set of transitions, wherein each one in the set of transitions is associated with two or more of the plurality of actions;

receive a set of parameters including at least one dynamic input parameter including an unresolved value, wherein the unresolved value automatically resolves to a value during execution of a product recipe of the batch process without obtaining the value from the product recipe or an operator prompt associated at the phase level of the product recipe; and, generate the product recipe including the action of the received procedure definition and the received dynamic input parameter, wherein the dynamic input parameter automatically resolves to a value at a transition from one step of the recipe to another step of the recipe, or during the execution of a step, an operation, or a phase of the executing batch process.

27. The system of claim 26, wherein the logic level of the generated product recipe includes a phase level at which the batch process interacts with equipment.

28. A system executing a product recipe of a batch process in a manufacturing environment, the system comprising:
- a processor;
- a user interface coupled to the processor; and
- a memory device coupled to the processor and including instructions stored thereon, which when executed by the processor, cause the system to:
  - receive, at the user interface, a plurality of selectable command sets for insertion into a product recipe, the selectable commands sets including:
    - a procedure command set specifying a plurality of actions defining a plurality of logic levels including a phase level at which the batch process interacts with equipment;
    - a transaction command set specifying a set of transitions, wherein each one in the set of transitions is associated with two or more of the plurality of actions;
    - a parameter command set including at least one dynamic input parameter including an unresolved value, wherein the unresolved value automatically resolves to a value during execution of a product recipe of the batch process without obtaining the value from the product recipe or an operator prompt associated at the phase level of the product recipe;
  - generate the product recipe including the received selected command set and the received dynamic input parameter, wherein the dynamic input parameter automatically resolves to a value at a transition from one step of the recipe to another step of the recipe, or during the execution of a step, an operation, or a phase of the executing batch process.

29. The system of claim 28, wherein the selected command set includes an action within a logic level, the logic level including a phase level at which the batch process interacts with equipment.

* * * * *